(12) United States Patent
Nihei

(10) Patent No.: US 9,307,000 B2
(45) Date of Patent: Apr. 5, 2016

(54) CONTENT DISTRIBUTION SYSTEM, CONTENT DISTRIBUTION DEVICE, CONTENT DISTRIBUTION METHOD AND PROGRAM

(75) Inventor: Koichi Nihei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 13/811,598

(22) PCT Filed: Jul. 1, 2011

(86) PCT No.: PCT/JP2011/065177
§ 371 (c)(1),
(2), (4) Date: Jan. 22, 2013

(87) PCT Pub. No.: WO2012/011378
PCT Pub. Date: Jan. 26, 2012

(65) Prior Publication Data
US 2013/0124622 A1    May 16, 2013

(30) Foreign Application Priority Data

Jul. 22, 2010    (JP) ................................ 2010-164715

(51) Int. Cl.
*G06F 15/16*    (2006.01)
*H04L 29/06*    (2006.01)

(52) U.S. Cl.
CPC .......... *H04L 65/601* (2013.01); *H04L 65/4007* (2013.01); *H04L 65/80* (2013.01)

(58) Field of Classification Search
CPC ............................ H04L 65/60; H04L 65/4084
USPC ................................................. 709/201, 203
See application file for complete search history.

(56) References Cited

U.S. PATENT DOCUMENTS

2002/0018450 A1*    2/2002    McKenna et al. ............. 370/328
2010/0217660 A1*    8/2010    Biswas ...................... 705/14.38

FOREIGN PATENT DOCUMENTS

| JP | 11-289350 A | 10/1999 |
|---|---|---|
| JP | 2000-286845 A | 10/2000 |
| JP | 2005-167675 A | 6/2005 |
| JP | 2007-533215 A | 11/2007 |
| JP | 2008-278207 A | 11/2008 |
| WO | 2005/101740 A1 | 10/2005 |

OTHER PUBLICATIONS

International Search Report of PCT/JP2011/065177 dated Aug. 9, 2011.
Koichi Nihei et al., "A Bit Rate Control Method using Round-Trip Time of Probing Packets", Proceedings of the 2010 IEICE General Conference Tsushin 2, Mar. 2, 2010, pp. 99.
Communication dated Jun. 9, 2015 from the Japanese Patent Office in counterpart application No. 2012-525366.
Yuichi Takahashi, Takeyuki Sugimoto, Saneyasu Yamaguchi, Koichi Asatani, "A Dynamic Rate Control Scheme Using ICMP Echo Success Rate and RTT Threshold for Video Streaming Variation on IEEE802.11b Inter-Building Wireless Systems", IEICE Technical Research Report, vol. 108, No. 457, IEICE, Feb. 24, 2009, pp. 83-88.

* cited by examiner

*Primary Examiner* — Adnan Mirza
(74) *Attorney, Agent, or Firm* — Sughrue Mion, PLLC

(57) ABSTRACT

To provide a content distribution system for suitably controlling bit rate for each receiving terminal while reducing the number of probe packets transmitted toward the receiving terminals from a distribution device. A content distribution device which is mutually connected via a network to a plurality of receiving terminals has a content packet transmission unit for transmitting content data, a probe packet transmission unit for transmitting probe packets, a probe packet reception unit for receiving return packets from the receiving terminals, and a transmission control unit for determining the transmission intervals of the probe packets and the bit rate of the content data. In addition, the transmission control unit treats receiving terminals having similar time variations in the bit rate as a small group in determining the transmission intervals of probe packets to be transmitted to the receiving terminals belonging to the same small group together.

9 Claims, 25 Drawing Sheets

FIG. 4

| TERMINAL 10.1.1.1 | | | |
|---|---|---|---|
| PROBE PACKET ID | TRANSMISSION TIME | RECEPTION TIME | FLAG |
| 1 | 100.000 | 100.100 | |
| 2 | 100.200 | 100.250 | |
| 3 | 100.400 | | |
| 4 | 100.600 | | |
| 5 | 100.800 | | 1 |
| 6 | 101.000 | | |
| ... | ... | ... | ... |

| TERMINAL 10.1.2.2 | | | |
|---|---|---|---|
| PROBE PACKET ID | TRANSMISSION TIME | RECEPTION TIME | FLAG |
| ... | ... | ... | ... |

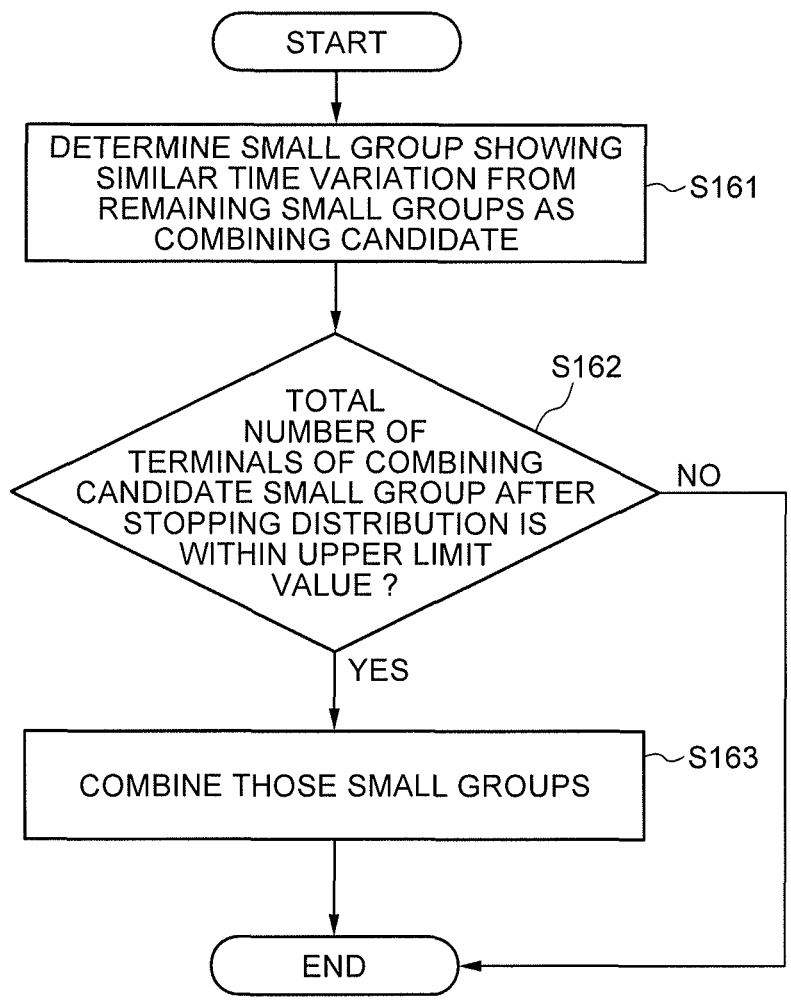

FIG. 14A

TERMINAL MANAGEMENT TABLE

| TERMINAL IDENTIFIER | LARGE GROUP ID | SMALL GROUP ID |
|---|---|---|
| 10.1.1.1 | A | |
| | | |
| | | |
| | | |
| | | |

FIG. 14B

PROBING MANAGEMENT TABLE

TERMINAL 10.1.1.1

| PROBE PACKET ID | TRANSMISSION TIME | RECEPTION TIME | FLAG |
|---|---|---|---|
| | | | |
| | | | |
| | | | |
| | | | |
| | | | |

FIG. 14C

GROUP CONTROL INFORMATION MANAGEMENT TABLE

| LARGE GROUP ID | SMALL GROUP ID | TIME | CONTROL RESULT |
|---|---|---|---|
| | | | |
| | | | |
| | | | |
| | | | |
| | | | |

FIG. 14D

TERMINAL CONTROL INFORMATION MANAGEMENT TABLE

| TIME | TERMINAL IDENTIFIER | CONTROL RESULT |
|---|---|---|
| | | |
| | | |
| | | |
| | | |
| | | |

FIG. 15A
TERMINAL MANAGEMENT TABLE

| TERMINAL IDENTIFIER | LARGE GROUP ID | SMALL GROUP ID |
|---|---|---|
| 10.1.1.1 | A | |
| | | |
| | | |
| | | |

151

FIG. 15B
PROBING MANAGEMENT TABLE

TERMINAL 10.1.1.1

| PROBE PACKET ID | TRANSMISSION TIME | RECEPTION TIME | FLAG |
|---|---|---|---|
| 1 | 1.2 | | |
| 2 | 1.4 | | |
| 3 | 1.6 | | |
| 4 | 1.8 | | 1 |
| 5 | 2.0 | | |

152

FIG. 15C
GROUP CONTROL INFORMATION MANAGEMENT TABLE

| LARGE GROUP ID | SMALL GROUP ID | TIME | CONTROL RESULT |
|---|---|---|---|
| | | | |
| | | | |
| | | | |
| | | | |
| | | | |
| | | | |

153

FIG. 15D
TERMINAL CONTROL INFORMATION MANAGEMENT TABLE

| TIME | TERMINAL IDENTIFIER | CONTROL RESULT |
|---|---|---|
| 1.0 | 10.1.1.1 | 1Mbps |
| | | |
| | | |
| | | |
| | | |
| | | |

154

FIG. 16A
TERMINAL MANAGEMENT TABLE

| TERMINAL IDENTIFIER | LARGE GROUP ID | SMALL GROUP ID |
|---|---|---|
| 10.1.1.1 | A | 1 |
| | | |
| | | |
| | | |
| | | |
| | | |

FIG. 16B
PROBING MANAGEMENT TABLE — TERMINAL 10.1.1.1

| PROBE PACKET ID | TRANSMISSION TIME | RECEPTION TIME | FLAG |
|---|---|---|---|
| 1 | 1.2 | 1.30 | |
| 2 | 1.4 | 1.45 | |
| 3 | 1.6 | 1.65 | |
| 4 | 1.8 | 1.90 | |
| 5 | 2.0 | 2.20 | 1 |
| ... | ... | ... | ... |

FIG. 16C
GROUP CONTROL INFORMATION MANAGEMENT TABLE

| LARGE GROUP ID | SMALL GROUP ID | TIME | CONTROL RESULT |
|---|---|---|---|
| | | | |
| | | | |
| | | | |
| | | | |
| | | | |

FIG. 16D
TERMINAL CONTROL INFORMATION MANAGEMENT TABLE

| TIME | TERMINAL IDENTIFIER | CONTROL RESULT |
|---|---|---|
| 1.0 | 10.1.1.1 | 1Mbps |
| 2.0 | 10.1.1.1 | 1.5Mbps |
| ... | ... | ... |
| 10.0 | 10.1.1.1 | 2Mbps |
| | | |
| | | |

FIG. 17A

TERMINAL MANAGEMENT TABLE

| TERMINAL IDENTIFIER | LARGE GROUP ID | SMALL GROUP ID |
|---|---|---|
| 10.1.1.1 | A | 1 |
| 10.1.1.2 | A | 2 |
| | | |
| | | |

FIG. 17B

PROBING MANAGEMENT TABLE

TERMINAL 10.1.1.1

| PROBE PACKET ID | TRANSMISSION TIME | RECEPTION TIME | FLAG |
|---|---|---|---|
| 1 | 1.2 | 1.30 | |
| 2 | 1.4 | 1.45 | |
| 3 | 1.6 | 1.65 | |
| 4 | 1.8 | 1.90 | |
| 5 | 2.0 | 2.20 | 1 |
| ... | ... | ... | ... |

FIG. 17C

GROUP CONTROL INFORMATION MANAGEMENT TABLE

| LARGE GROUP ID | SMALL GROUP ID | TIME | CONTROL RESULT |
|---|---|---|---|
| A | 1 | 16.0 | 2Mbps |
| A | 1 | 18.0 | 2Mbps |
| A | 1 | 20.0 | 3Mbps |
| A | 1 | 22.0 | 2Mbps |
| A | 1 | 24.0 | 3Mbps |
| | | | |

FIG. 17D

TERMINAL CONTROL INFORMATION MANAGEMENT TABLE

| TIME | TERMINAL IDENTIFIER | CONTROL RESULT |
|---|---|---|
| 16.0 | 10.1.1.2 | 1Mbps |
| 18.0 | 10.1.1.2 | 2Mbps |
| 20.0 | 10.1.1.2 | 4Mbps |
| 22.0 | 10.1.1.2 | 3Mbps |
| 24.0 | 10.1.1.2 | 4Mbps |
| | | |

FIG. 18A

TERMINAL MANAGEMENT TABLE

| TERMINAL IDENTIFIER | LARGE GROUP ID | SMALL GROUP ID |
|---|---|---|
| 10.1.1.1 | A | 1 |
| 10.1.1.2 | A | 2 |
| 10.1.2.3 | A | |
| ... | | |

FIG. 18B

PROBING MANAGEMENT TABLE

TERMINAL 10.1.1.1

| PROBE PACKET ID | TRANSMISSION TIME | RECEPTION TIME | FLAG |
|---|---|---|---|
| 1 | 1.2 | 1.30 | |
| 2 | 1.4 | 1.45 | |
| 3 | 1.6 | 1.65 | |
| 4 | 1.8 | 1.90 | |
| 5 | 2.0 | 2.20 | 1 |
| ... | ... | ... | ... |

FIG. 18C

GROUP CONTROL INFORMATION MANAGEMENT TABLE

| LARGE GROUP ID | SMALL GROUP ID | TIME | CONTROL RESULT |
|---|---|---|---|
| A | 1 | 32.0 | 2Mbps |
| A | 1 | 34.0 | 2Mbps |
| A | 1 | 36.0 | 4Mbps |
| A | 1 | 38.0 | 4Mbps |
| A | 1 | 40.0 | 4Mbps |
| A | 2 | 32.0 | 3Mbps |
| A | 2 | 34.0 | 2Mbps |
| A | 2 | 36.0 | 2Mbps |
| A | 2 | 38.0 | 1Mbps |
| A | 2 | 40.0 | 1Mbps |

FIG. 18D

TERMINAL CONTROL INFORMATION MANAGEMENT TABLE

| TIME | TERMINAL IDENTIFIER | CONTROL RESULT |
|---|---|---|
| 32.0 | 10.1.2.3 | 2Mbps |
| 34.0 | 10.1.2.3 | 2Mbps |
| 36.0 | 10.1.2.3 | 4Mbps |
| 38.0 | 10.1.2.3 | 4Mbps |
| 40.0 | 10.1.2.3 | 4Mbps |

FIG. 19

| TIME | RECEIVING TERMINAL A | RECEIVING TERMINAL B | RECEIVING TERMINAL C | ENTIRE GROUP |
|---|---|---|---|---|
| 200 | INCREASED | INCREASED | DECREASED | INCREASED |
| 202 | INCREASED | INCREASED | DECREASED | INCREASED |
| 204 | MAINTAINED | MAINTAINED | DECREASED | MAINTAINED |
| 206 | MAINTAINED | MAINTAINED | DECREASED | MAINTAINED |
| 208 | MAINTAINED | MAINTAINED | DECREASED | MAINTAINED |

FIG. 20

| TIME | SMALL GROUP X (3 TERMINALS) | SMALL GROUP Y (3 → 2 TERMINALS) | SMALL GROUP Z (1 TERMINAL) |
|---|---|---|---|
| 300 | INCREASED | INCREASED | DECREASED |
| 302 | INCREASED | INCREASED | DECREASED |
| 304 | MAINTAINED | MAINTAINED | DECREASED |
| 306 | MAINTAINED | MAINTAINED | DECREASED |
| 308 | MAINTAINED | MAINTAINED | DECREASED |

CONTENT DISTRIBUTION SYSTEM, CONTENT DISTRIBUTION DEVICE, CONTENT DISTRIBUTION METHOD AND PROGRAM

CROSS REFERENCE TO RELATED APPLICATIONS

This application is a National Stage of International Application No. PCT/JP2011/065177 filed Jul. 1, 2011, claiming priority based on Japanese Patent Application No. 2010-164715 filed Jul. 22, 2010, the contents of all of which are incorporated herein by reference in their entirety.

TECHNICAL FIELD

The present invention relates to a content distribution system, a content distribution device, a content distribution method, and a program thereof. More specifically, the present invention relates to a content distribution system and the like capable of suppressing decrease in the number of streams that can be distributed simultaneously and deterioration in the communication quality thereof.

BACKGROUND ART

Distribution of contents such as videos and audios by utilizing networks such as the Internet has been widely spread. In order to continue distribution with stable videos and audios, it is important to properly set the bit rate and the like of the content data transmitted to a receiving terminal from a content distribution device (server) in accordance with the network state that changes moment by moment.

Thus, as depicted in Non-Patent Document 1, a content distribution device regularly transmits probe packets to a reception device, estimates the network state from variations in round-trip time of the probe packets, and sends out content data with a bit rate suited for the estimated network state.

Further, as related patent documents thereof, there are following documents. Among those, depicted in Patent Document 1 is a technique which puts terminals of close distances (small hop number between the terminals) into a group when distributing content from a distribution server to the terminals with multicast, and determines the bit rate for distribution by predicting the useable band by each group.

Depicted in Patent Document 2 is a multicast data distribution method which checks a band width that can be reserved in all communication paths of all receiving terminals prior to transmission of content data, and transmits data by conforming to the band width. Depicted in Patent Document 3 are stream data distribution and the like, with which a capable band width of the communication paths is estimated by using a test stream. Depicted in Patent Document 4 is a technique which enables measurements of performance of IP network using the probe packets to be more precise.

Patent Document 1: Japanese Unexamined Patent Publication 2005-167675
Patent Document 2: Japanese Unexamined Patent Publication 2000-286845
Patent Document 3: Japanese Unexamined Patent Publication 2008-278207
Patent Document 4: Japanese Unexamined Patent Publication 2007-533215
Non-Patent Document 1: "A bit rate control method using round-trip time of probing packets", Nihei et al., B-6-99, IEICE General Conference 2010

However, with the technique depicted in Non-Patent Document 1 which estimates the network state by the probe packets, it is necessary to transmit a defined number of probe packets to all the receiving terminals that receive the content transmitted from the content distribution device.

Therefore, the number of terminals is increased. Thus, when content is distributed to the great number of terminals simultaneously, the load imposed upon transmission and reception of the probe packets to be transmitted becomes increased accordingly. This causes increase in the load imposed upon the content distribution device, the network apparatus, and the lines, while causing decrease in the number of distributable streams as well as deterioration in the communication quality of each receiving terminal at the same time.

The network state between the distribution device and the receiving terminal is mainly determined depending on the existence of the bottle-neck link (the link whose useable band is the minimum) on the communication path. The bottle-neck link and the useable band fluctuate as the time passes depending on the traffic of a specific terminal and the communication state and the like of a specific communication path. Thus, the time variations in the bit rates of the terminals whose bottle-neck link is the same often show similar tendencies.

Therefore, when the terminals of the same bottle-neck link can be put into a same group, the bit rates of the terminals belonging to the same group can be controlled collectively. Thus, it is considered that the number of probe packets to be sent out can be reduced. However, the technique depicted in Patent Document 1 is designed to put the terminals with the "hop number" of less than a prescribed value, and it is not by any means designed to put the terminals of the same "bottle-neck link" into a same group.

Therefore, when a group is constituted by the method depicted in Patent Document 1, there is a possibility that the terminals of different bottle-neck links are put into a same group. In such case, a proper control of bit rate done collectively for the same group cannot be achieved. For example, there may be a case where the bit rate is suppressed to the extent of more than it is required even though there is a margin in the band or there may be a case of vice versa. Inversely, there may be a case where the terminals of same bottle-neck link are put into different groups with this method. In such case, the effect of reducing the number of probe packets cannot be acquired.

In the rest of Patent Documents 2 to 4, the technique of collectively controlling the bit rates and the like for the terminals of the same bottle-neck link is not depicted. Therefore, the above-described issues cannot be overcome with the techniques depicted therein.

It is an object of the present invention to provide a content distribution system, a content distribution device, a content distribution method, and a program thereof, which can reduce the number of probe packets to be transmitted towards the receiving terminals from the distribution device while properly controlling the bit rates for each of the receiving terminals and thereby can suppress the reduction in the number of streams that can be distributed simultaneously as well as the deterioration in the communication quality.

In order to achieve the foregoing object, the content distribution system according to the present invention is a content distribution system constituted with a content distribution device and a plurality of receiving terminals connected mutually via a network, and the content distribution device transmits content data to the receiving terminals. The content distribution device is characterized to include: a content packet transmission unit which transmits the content data to the receiving terminals; a probe packet transmission unit which transmits probe packets for estimating a state of the network to the receiving terminals; a probe packet reception unit which receives return packets for the probe packets from the receiving terminals; and a transmission control unit which specifies round-trip time from transmission of the probe packets to reception of the return packets, and determines a transmission interval of the probe packets and the bit rate of the content data to be transmitted from the round-trip time; and the transmission control unit is characterized to define the reception terminals having similar time variations in the bit rate among the receiving terminals as a small group, and to determine the transmission interval of the probe packets and the bit rate of the content data to be transmitted collectively for the receiving terminals belonging to the same small group.

In order to achieve the foregoing object, the content distribution device according to the present invention is a content distribution device which is constituted by being mutually connected to a plurality of receiving terminals via a network and transmits content data to the receiving terminals. The content distribution device is characterized to include: a content packet transmission unit which transmits the content data to the receiving terminals; a probe packet transmission unit which transmits probe packets for estimating a state of the network to the receiving terminals; a probe packet reception unit which receives return packets for the probe packets from the receiving terminals; and a transmission control unit which specifies round-trip time from transmission of the probe packets to reception of the return packets, and determines a transmission interval of the probe packets and the bit rate of the content data to be transmitted from the round-trip time, wherein the transmission control unit defines the reception terminals having similar time variations in the bit rate among the receiving terminals as a small group, and determines a transmission interval of the probe packets and the bit rate of the content data to be transmitted collectively for the receiving terminals belonging to the same small group.

In order to achieve the foregoing object, the content distribution method according to the present invention is a content distribution method used for a content distribution system constituted with a content distribution device and a plurality of receiving terminals connected mutually via a network and the content distribution device transmits content data to the receiving terminals, wherein: a content packet transmission unit of the content distribution device transmits the content data to the receiving terminals; a probe packet transmission unit of the content distribution device transmits probe packets for estimating a state of the network to the receiving terminals; a probe packet reception unit of the content distribution device receives return packets for the probe packets from the receiving terminals; a transmission control unit of the content distribution device specifies round-trip time from transmission of the probe packets to reception of the return packets; the transmission control unit of the content distribution device defines the receiving terminals having similar time variations in the bit rate among the receiving terminals as a small group; and the transmission control unit of the content distribution device determines a transmission interval of the probe packets and the bit rate of the content data to be transmitted collectively for the receiving terminals belonging to the same small group.

In order to achieve the foregoing object, the content distribution program according to the present invention is a content distribution program used in a content distribution system which is constituted with a content distribution device and a plurality of receiving terminals connected mutually via a network and the content distribution device transmits content data to the receiving terminals. The program is characterized to cause a computer provided to the content distribution device to execute: a procedure for transmitting the content data to the receiving terminals; a procedure for transmitting probe packets for estimating a state of the network to the receiving terminals; a procedure for receiving return packets for the probe packets from the receiving terminals; a procedure for specifying round-trip time from transmission of the probe packets to reception of the return packets; a procedure for determining the bit rate of the content data to be transmitted from the specified round-trip time; a procedure for defining the receiving terminals having similar time variations in the bit rate among the receiving terminals as a small group; and a procedure for determining a transmission interval of the probe packets collectively for the receiving terminals belonging to the same small group.

The present invention is structured to put the receiving terminals having similar time variations in the bit rate (i.e., terminal of same bottle-neck link) into a small group as described above. Therefore, the number of probe packets to be transmitted to the same small group can be reduced. This makes it possible to provide a content distribution system, a content distribution device, a content distribution method, and a program thereof, which can reduce the number of probe packets to be transmitted towards the receiving terminals from the distribution device while properly controlling the bit rate for each of the receiving terminals and thereby can suppress the reduction in the number of streams that can be distributed simultaneously as well as the deterioration in the communication quality.

BRIEF DESCRIPTION OF THE DRAWINGS

FIG. 4 is an explanatory chart showing the content of a probing management table stored in the terminal information storage unit shown in FIG. 2;

FIG. 13 is a flowchart for more specifically describing the operations done by the packet transmission control function described as step S32 in FIG. 12 for judging whether or not to combine the small groups;

FIGS. 14A-14D show explanatory charts showing contents of each of the tables stored in the terminal information storage unit at a stage where processing of receiving a distribution request from a first receiving terminal and generating a probing management table is completed, in which FIG. 14A is a terminal management table, FIG. 14B is a probing management table, FIG. 14C is a group control information management table, and FIG. 14D is a terminal control information management table, respectively;

FIGS. 15A-15D shows explanatory charts showing contents of each of the tables stored in a terminal information storage unit at a stage where processing of determining the transmission time of the probe packets and putting up a flag is completed, in which FIG. 15A is a terminal management table, FIG. 15B is a probing management table, FIG. 15C is a group control information management table, and FIG. 15D is a terminal control information management table, respectively;

FIGS. 16A-16D shows explanatory charts showing contents of each of the tables stored in a terminal information storage unit at a stage where processing of generating and registering a small group anew, in which FIG. 16A is a terminal management table, FIG. 16B is a probing management table, FIG. 16C is a group control information management table, and FIG. 16D is a terminal control information management table, respectively;

FIGS. 17A-17D shows explanatory charts showing contents of each of the tables stored in a terminal information storage unit at a point of time 24 [s], in which FIG. 17A is a terminal management table, FIG. 17B is a probing management table, FIG. 17C is a group control information management table, and FIG. 17D is a terminal control information management table, respectively;

FIGS. 18A-18D shows explanatory charts showing contents of each of the tables stored in a terminal information storage unit at a point of time 40 [s], in which FIG. 18A is a terminal management table, FIG. 18B is a probing management table, FIG. 18C is a group control information management table, and FIG. 18D is a terminal control information management table, respectively;

FIG. 19 is an explanatory chart showing judgment results of being "increased", "maintained", and "decreased" regarding the bit rate in step S106 of the small group constituted with three receiving terminals and an example of increase/decrease tendency of the transmission rate of the entire small group determined in step S107;

FIG. 20 is an explanatory chart showing examples of the number of receiving terminals of the small groups X to Z within a same large group and the control history;

BEST MODES FOR CARRYING OUT THE INVENTION

First Exemplary Embodiment

Figure 1:
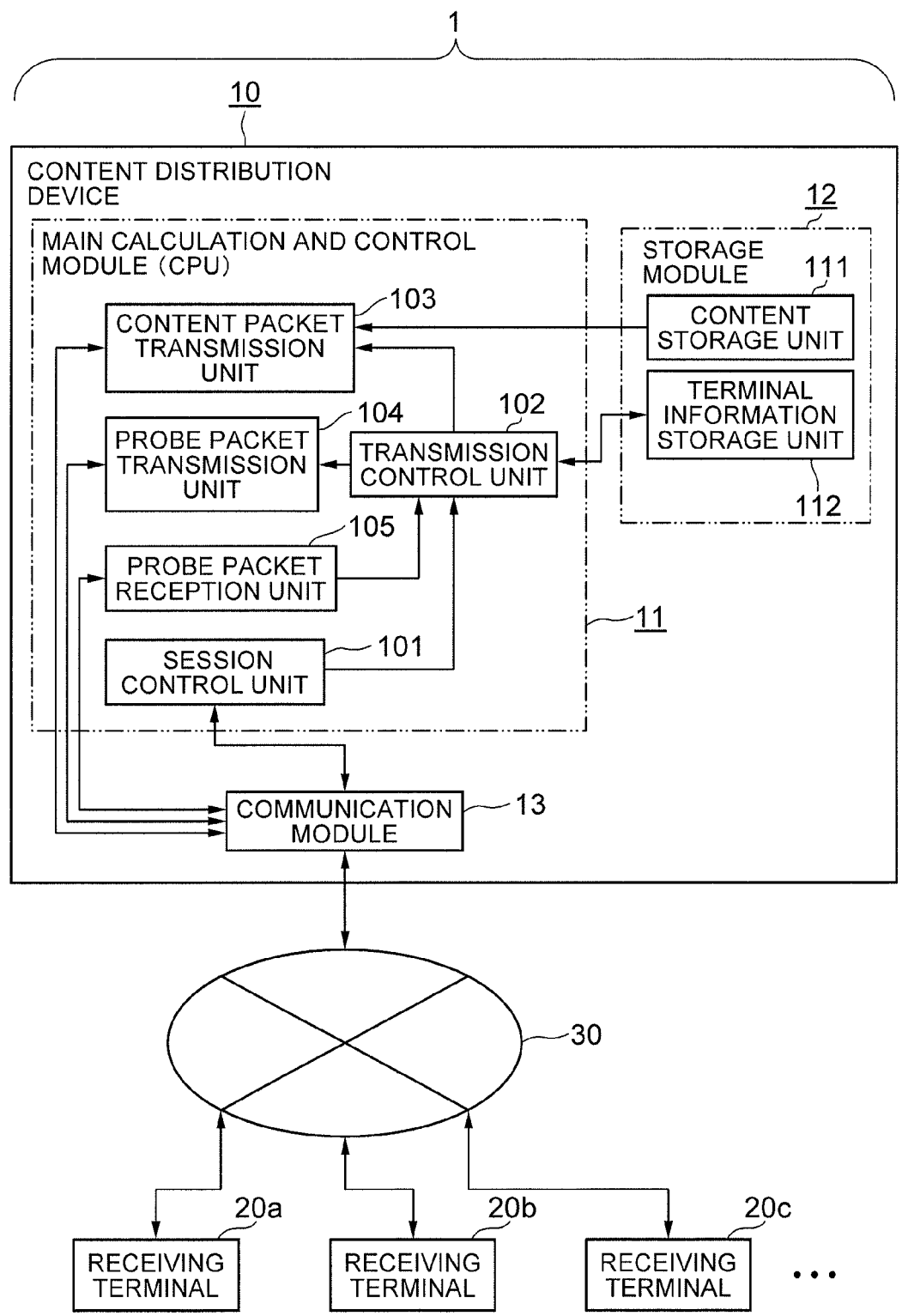
FIG. 1 is an explanatory chart showing the structure of a content distribution system according to a first exemplary embodiment of the present invention.

Hereinafter, the structure of a first exemplary embodiment according to the present invention will be described by referring to the accompanying drawings 1 to 2.

The basic contents of the exemplary embodiment will be described first, and the more specific contents will be described thereafter.

A content distribution system 1 according to the exemplary embodiment is a content distribution system which is constituted by mutually connecting a content distribution device 10 and a plurality of receiving terminals 20 via a network 30, in which the content distribution device transmits content data to the receiving terminals. The content distribution device 10 includes: a content packet transmission unit 103 which transmits content data to the receiving terminals; a probe packet transmission unit 104 which transmits probe packets used for estimating the network state to the receiving terminals; a probe packet reception unit 105 which receives return packets for the probe packets from the receiving terminals; and a transmission control unit 102 which specifies round-trip time from transmission of the probe packets to reception of the return packets, and determines the transmission interval of the probe packets and the bit rate of the content data based on the round-trip time. Further, the transmission control unit 102 classifies the receiving terminals having the similar time variations in the bit rate among the reception terminals into small groups, and collectively determines the transmission interval of the probe packets and the bit rate of the content data to be transmitted for the receiving terminals belonging to a same small group.

Further, the transmission control unit 102 includes a function which judges the time variation in the bit rate of each of the receiving terminals belonging to the same groups, and reconstructs the small groups based on the judgment result.

The transmission control unit 102 further includes a function which, regarding the receiving terminal not belonging to the small group, adds the receiving terminal to the small group provided that the receiving terminal has the time variation in the bit rate similar to that of the existing small group and number of the receiving terminals belonging to that small group is within an upper limit given in advance. The transmission control unit 102 judges the time variation in the bit rate of the receiving terminals and rebuilds the small groups every time a prescribed number of probe packets are transmitted.

Further, the transmission control unit 102 includes a function which, when a session control unit receives a distribution stop request from one of the receiving terminals, combines the small groups having similar time variations in the bit rate among the existing small groups provided that the total number of the receiving terminals belonging to those groups are within an upper limit value.

Through providing the above-described structure, the content distribution system 1 of the exemplary embodiment can reduce the number of probe packets to be transmitted to a same small group and can suppress reduction in the number of streams that can be distributed simultaneously as well as deterioration in the communication quality for each terminal. Hereinafter, this will be described in more details.

FIG. 1 is an explanatory chart showing the structure of the content distribution system 1 according to the first exemplary embodiment of the present invention. The content distribution system 1 is constituted by mutually connecting the content distribution device 10 to a plurality of receiving terminals 20a, 20b, 20c, - - - via the Internet 30. Hereinafter, the receiving terminals 20a, 20b, 20c, - - - will be generally referred to as the receiving terminals 20. Further, the receiving terminal may simply be referred to as a terminal in some cases.

The content distribution device 10 is a computer device (server) which includes: a main arithmetic operation control module (CPU) 11 which executes computer programs; a storage module (main storage module, and an external storage module such as a hard disk) 12 for storing various kinds of data and programs; and a communication module 13 which performs data communications with other computers by being connected to the network 30.

In the main calculation and control module 11, the session control unit 101 which receives a distribution start request and a distribution stop request form the receiving terminals 20 and the probe packet reception unit 105 which informs information regarding the return for the probe packets received from the receiving terminals 20 to the transmission control unit 102 to be described later operate as computer programs. The information regarding the return for the probe packets herein contains the transmitter terminal that has sent the return, the probe packet ID, and the reception time.

Further, in the main calculation and control unit 11, the transmission control unit 102 which controls the content packet transmission unit 103 and the probe packet transmission unit 104 to be described later based on the information received from the probe packet reception unit 105, the content packet transmission unit 103 which puts the content data into a packet based on a control from the transmission control unit 102 and transmits it to the receiving terminals 20, and the probe packet transmission unit 104 which generates probe packets based on a control from the transmission control unit 102 and transmits it to the receiving terminals 20 also operate as computer programs.

Further, in the storage module 12, a content storage unit 111 as a storage region for storing various kinds of contents as distribution targets in a format that can be distributed with a plurality of kinds of bit rates is secured, and various contents are stored therein in advance. When the contents are stored in a hierarchically coded format such as H. 264/SVC (Scalable Video Coding), the volume in the content storage unit 111 can be reduced. The content packet transmission unit 103 takes out the content data from the content storage unit 111, and transmits it to the receiving terminals 20 with a bit rate designated by the transmission control unit 102. Further, a terminal information storage unit 112 to be described later is also secured.

The transmission control unit 102 determines the bit rate of the content to be transmitted to each of the receiving terminals 20 and the transmission time of the probe packets based on a distribution start notification or a distribution stop notification received from the session control unit 101, the transmitter terminal received from the probe packet reception unit 105, the probe packet ID, and the reception time, and designates those to the content packet transmission unit 103 and the probe packet transmission unit 104.

The receiving terminals 20 are devices of any kinds such as computer devices, mobile phone terminals, smart phones, set top boxes of IPTV (Internet Protocol Television), and the like, which have a function that receives a content distributed from the content distribution device 10 and reproduces it by being connected to the network 30 and a function that receives probe packets transmitted from the content distribution device 10 and returns a response for that.

The probe packet herein is "Echo Request" of ICMP (Internet Control Message Protocol, RFC792) that is supported in most of network apparatuses conforming to TCP/IP (Transmission Control Protocol/Internet Protocol), for example, and a response packet for that is "Echo Reply" of ICMP as well. Further, "UDP Echo" of UDP (User Datagram Protocol, RFC862) can be used as probe packets and a response packet as well.

With the standards of ICMP, a field of "sequence number" is defined. Thus, when the content distribution device 10 transmits "Echo Request", for example, an arbitrary value is set for the sequence number field in the packet. When the receiving terminal 20 upon receiving it returns "Echo Reply", the receiving terminal 20 returns the replay by using the value set in "Echo Request" for the sequence value field of that packet. Therefore, when the content distribution device 10 sets the different sequence number field for each probe packet to be transmitted, it is easy to identify which of the probe packets the returned response packet is sent for.

The network 30 is a packet exchange network, and it includes the Internet, ADSL (Asymmetric Digital Subscriber Line), and a network whose quality (band) is not guaranteed such as a wireless network.

Figure 2:
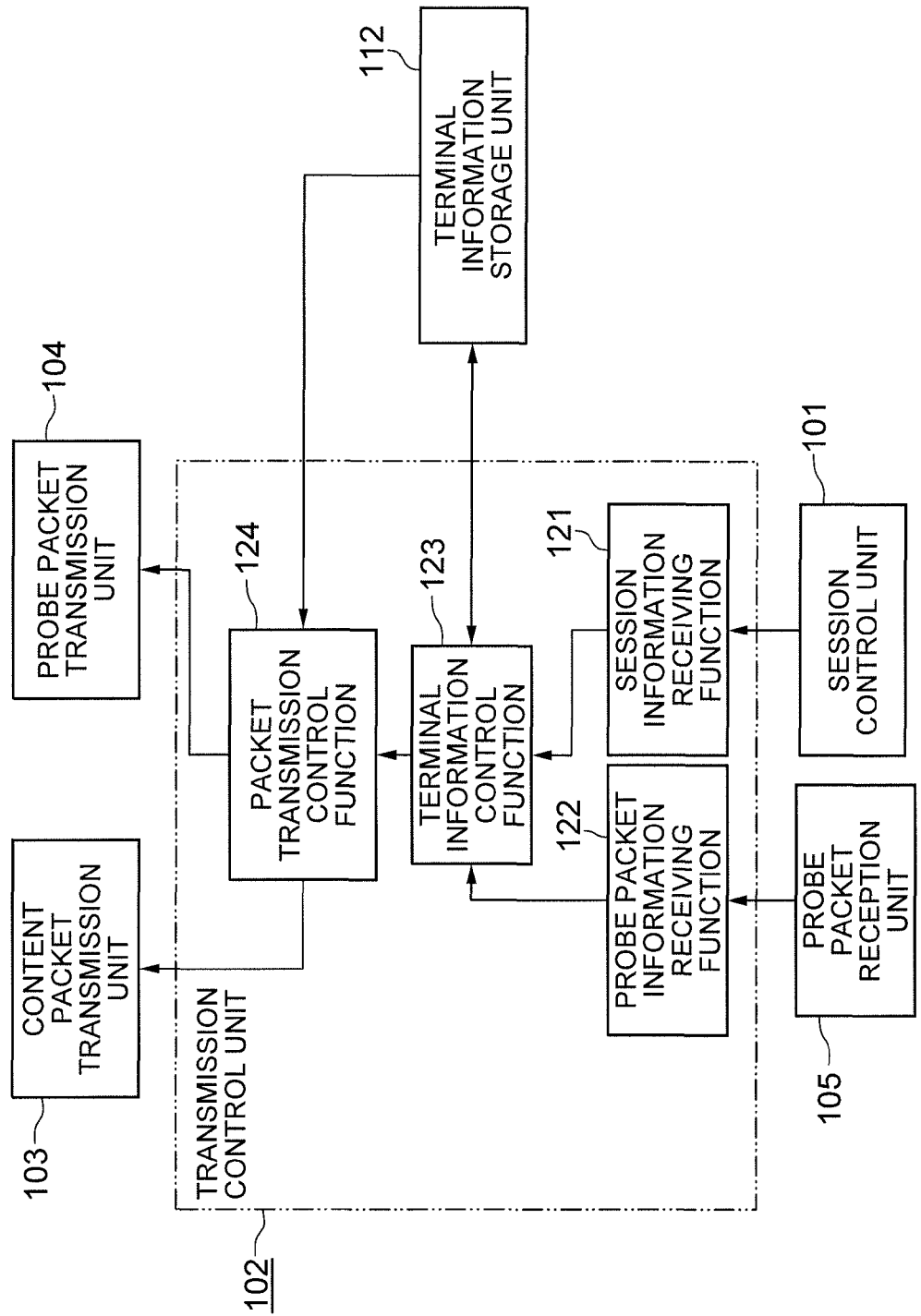
FIG. 2 is an explanatory chart showing a more detailed structure of a transmission control unit shown in FIG. 1.

FIG. 2 is an explanatory chart showing a more detailed structure of the transmission control unit 102 shown in FIG. 1. The transmission control unit 102 includes: a session information receiving function 121 which receives a distribution start notification and a distribution stop notification of each terminal from the session control unit 101; and a probe packet information receiving function 122 which receives the transmitter terminal of the probe packets response, the probe packet ID, and the reception time from the probe packet receiving unit.

The transmission control unit 102 further includes: a terminal information control function 123 which saves the information received from the session information receiving function 121 and the probe packet information receiving function 122 into the terminal information storage unit, and designates a packet transmission control function 124 to be described later to calculate the bit rate of the content to be distributed and the probe packet transmission time; and the packet transmission control function 124 which takes out the necessary information from the terminal information storage unit 112 to be described later and determines the bit rate of the content to be distributed and the probe packet transmission time based on the command from the terminal information control function 123, and designates those to the content packet transmission unit 103 and the probe packet transmission unit 104.

Further, in the storage module 12, the terminal information storage unit 112 to be described later as a storage region for storing each data with the terminal information control function 123 is secured. FIGS. 3 to 6 are explanatory charts showing the stored contents of the terminal information storage unit 112 shown in FIG. 2. In the terminal information storage unit 112, each of the tables such as a terminal management table 151, a probing management table 152, a group control information management table 153, and a terminal control information management table 154 is stored. Entries of each of those tables are added and deleted by the terminal information control function 123, and the packet transmission control function 124 refers to the entries.

Figure 3:
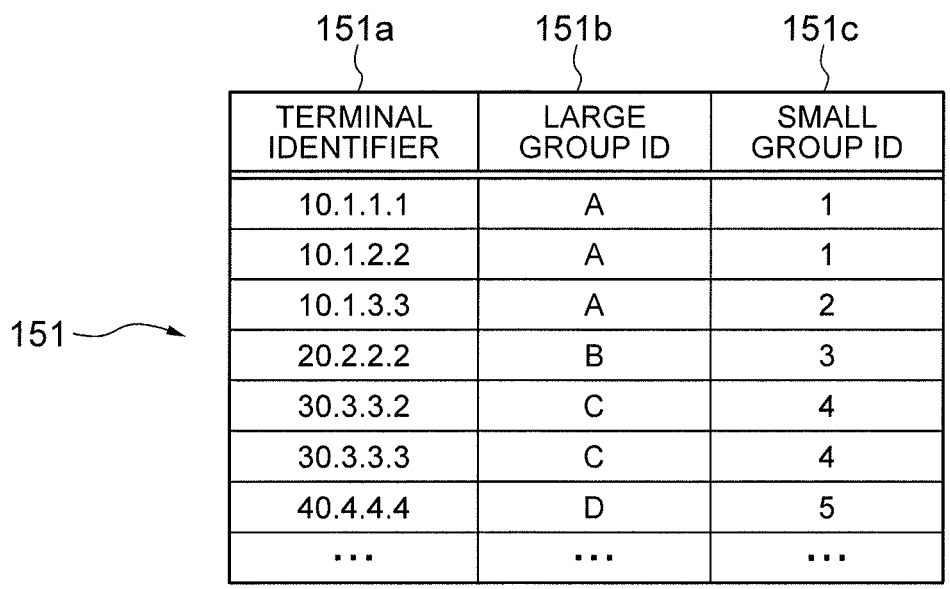
FIG. 3 is an explanatory chart showing the content of a terminal management table stored in a terminal information storage unit shown in FIG. 2.

Terminal identifiers 151a corresponding to each of the receiving terminals 20 as the distribution targets, and large group IDs 151b as well as small group IDs 151c corresponding to each of the terminal identifiers 151a are registered in the terminal management table 151 shown in FIG. 3. The large group IDs 151b and the small group IDs 151c will be described later. The terminal identifiers 151a may be of any kinds with which each terminal can be identified uniquely. For example, IP addresses of each of the receiving terminals 20 may be used or host names based on the domain name system may be used as well. In the case shown in FIG. 3, IP addresses are used as the terminal identifiers 151a.

Regarding the probing management table 152 shown in FIG. 4, a single table exists for each of the terminal identifiers 151a. In each of the tables, the probe packet ID 152a of the probe packets transmitted for each of the receiving terminals 20 as well as the transmission time 152b thereof, the reception time 152c at which a response therefore is received, and also a flag 152d to be described layer for that packet are registered.

Figure 5:
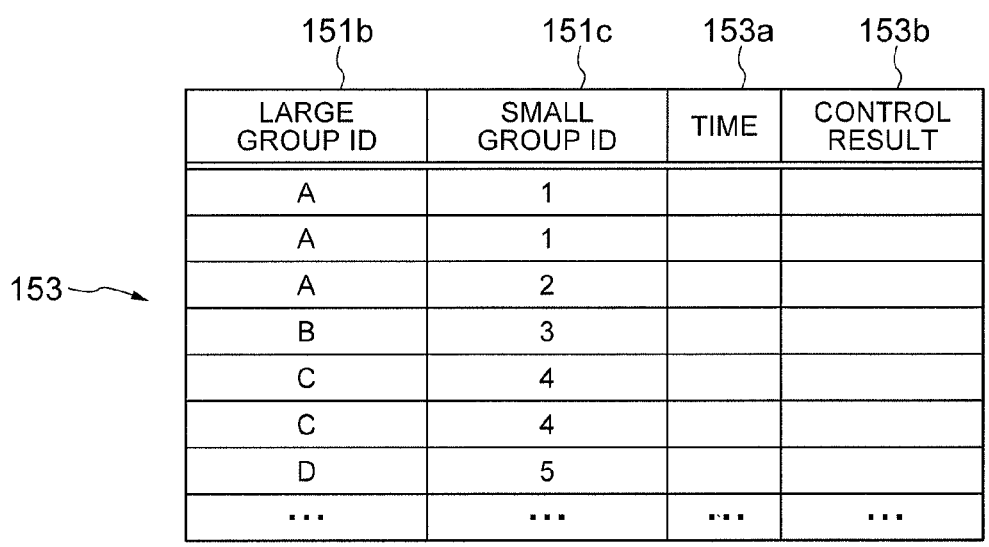
FIG. 5 is an explanatory chart showing the content of a group control information management table stored in the terminal information storage unit shown in FIG. 2.

In the group control information management table 153 shown in FIG. 5, the large group IDs 151b as well as the small group IDs 151c registered also in the terminal management table 151, execution time 153a of the controls done by the content distribution device 10 for each of those, and control results 153b thereof are registered. The control results 153b herein are specifically the bit rates of each terminal of the group corresponding to the execution time 153a.

Figure 6:
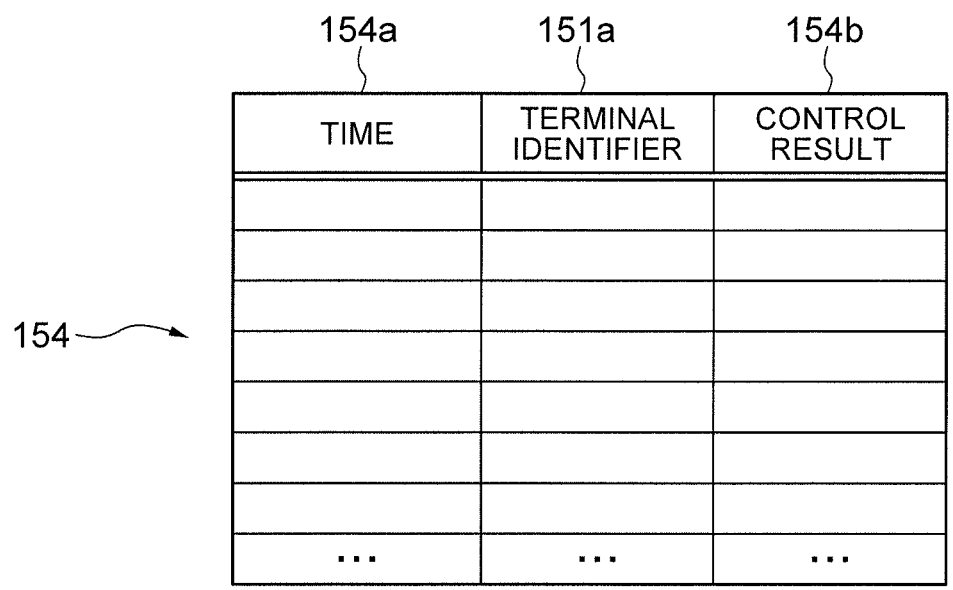
FIG. 6 is an explanatory chart showing the content of a terminal control information management table stored in the terminal information storage unit shown in FIG. 2.

In the terminal control management table 154 shown in FIG. 6, the terminal identifiers 151a registered also in the terminal management table 151, execution time 154a of the controls done by the content distribution device 10 for each of those, and control results 154b thereof are registered. The control results 154b herein are specifically the bit rates of each terminal of the group corresponding to the execution time 154a.

Figure 7:
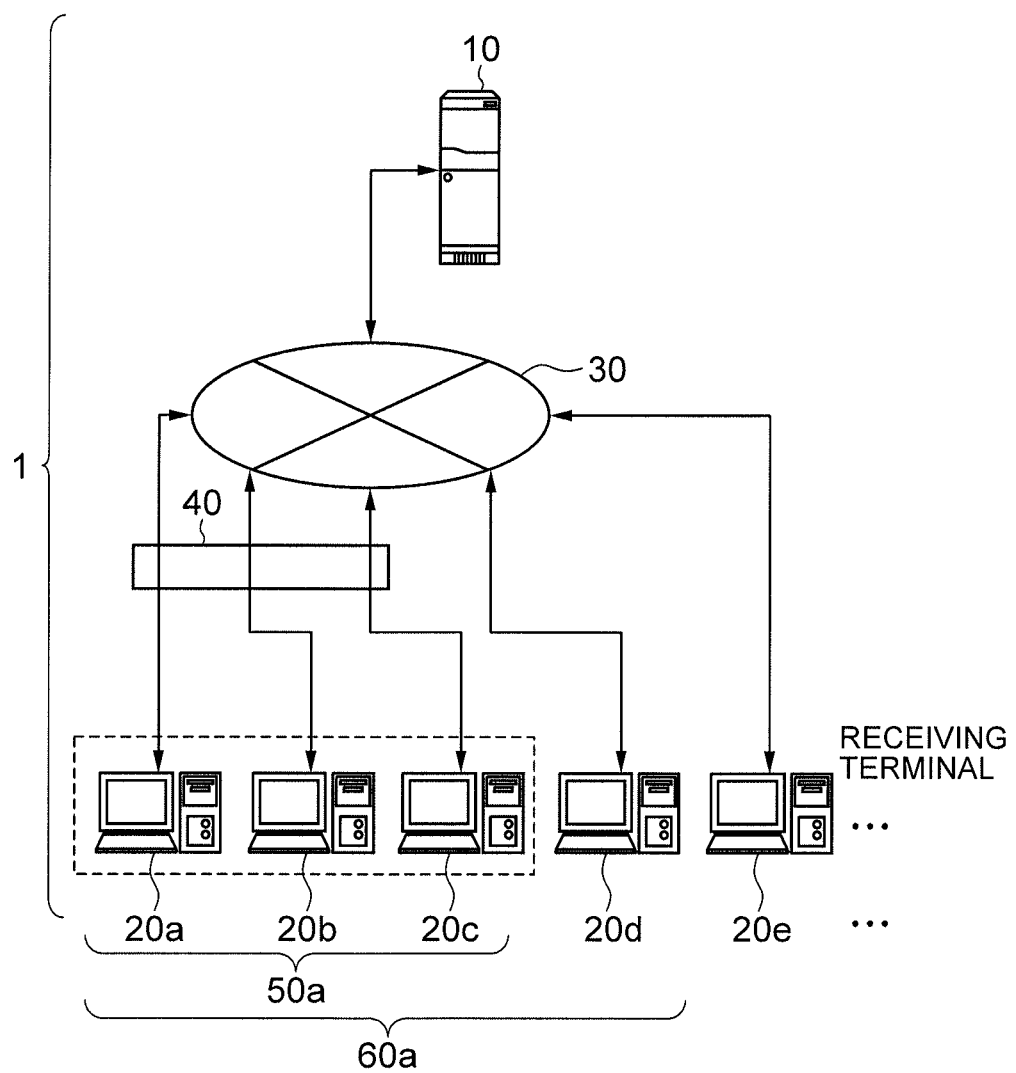
FIG. 7 is an explanatory chart for describing a large group and a small group of the content distribution system shown in FIG. 1.

FIG. 7 is an explanatory chart for describing the large group and the small group of the content distribution system 1 shown in FIG. 1. The content distribution device 10 takes a plurality of the receiving terminals 20 as a small group. In order to prevent the receiving terminals 20 that are largely different (low possibility of sharing a same bottle-neck link) in terms of network topologies (connection state) from belonging to a same small group and to lighten the load of calculation processing when forming the small group, a plurality of small groups are further put into a large group. More specifically, a plurality of small groups of a same ISP and existing in adjacent regions, for example, are put into a large group.

In FIG. 7, among a plurality of receiving terminals 20a to e, the receiving terminals 20a to d belong to a same large group 60a, and the receiving terminals 20a to c of a same bottle-neck link 40 among those further belong to a same small group 50a. The receiving terminal 20e does not belong to any of large groups and does not belong to any of small groups. Further, the receiving terminal 20d belongs to the large group 60a but does not belong to any of the small groups.

The small group herein is not a small group in which the receiving terminals 20 receiving a same kind of content distributed from the content distribution device 10 is put together but a small group in which the receiving terminals 20 showing a same tendency in the time variation regarding the bit rate are put together. That is, it is considered that the receiving terminals 20 showing the same tendency in the time variation regarding the bit rate are of the same bottle-neck link 40, so that the content distribution device 10 collectively handles those receiving terminals 20 as a small group and collectively performs change of the bit rate and the like in a unit of group. The details thereof will be described next.

Figure 8:
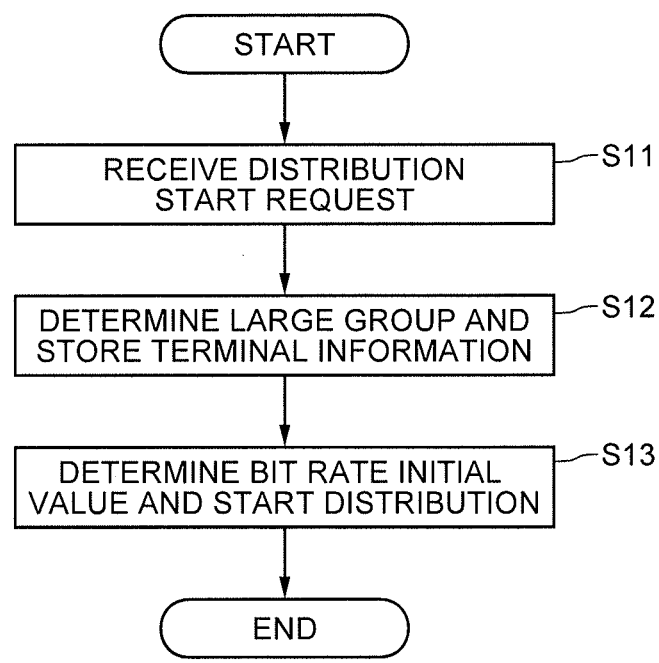
FIG. 8 is a flowchart showing operations of a content distribution device of the content distribution system shown in FIG. 1 in a case where one of receiving terminals requests the content distribution device to start content distribution anew.

FIG. 8 is a flowchart showing operations of the content distribution device 10 when one of the receiving terminals 20 requests a start of content distribution anew to the content distribution device 10 in the content distribution system 1 shown in FIG. 1.

When the session control unit 101 in the content distribution device 10 receives the distribution start request from the receiving terminal 20 (step S11), the terminal information control function 123 of the transmission control unit 102 determines the large group to which the receiving terminal belongs, adds an entry regarding a new terminal identifier 151a to the terminal management table 151 of the terminal information storage unit 112, and adds a new probing management table 152 corresponding to the terminal identifier 151a (step S12).

Further, the packet transmission control function 124 determines the initial value of the bit rate and the transmission time of the probe packets, and designates a start of distribution to the content packet transmission unit 103. Thereby, distribution of the content designated by the receiving terminal 20 is started anew (step S13).

The initial value of the bit rate herein may be determined by methods such as a method of selecting the lowest bit rate stored in advance to the content storage unit 111, a method of using the data of the past distribution, and a method of measuring a useable band prior to the distribution and determining the bit rate based on the measurement result. Note, however, that the method for determining the initial value itself is not included in a scope of the present invention, so that any other known techniques can be used.

Figure 9:
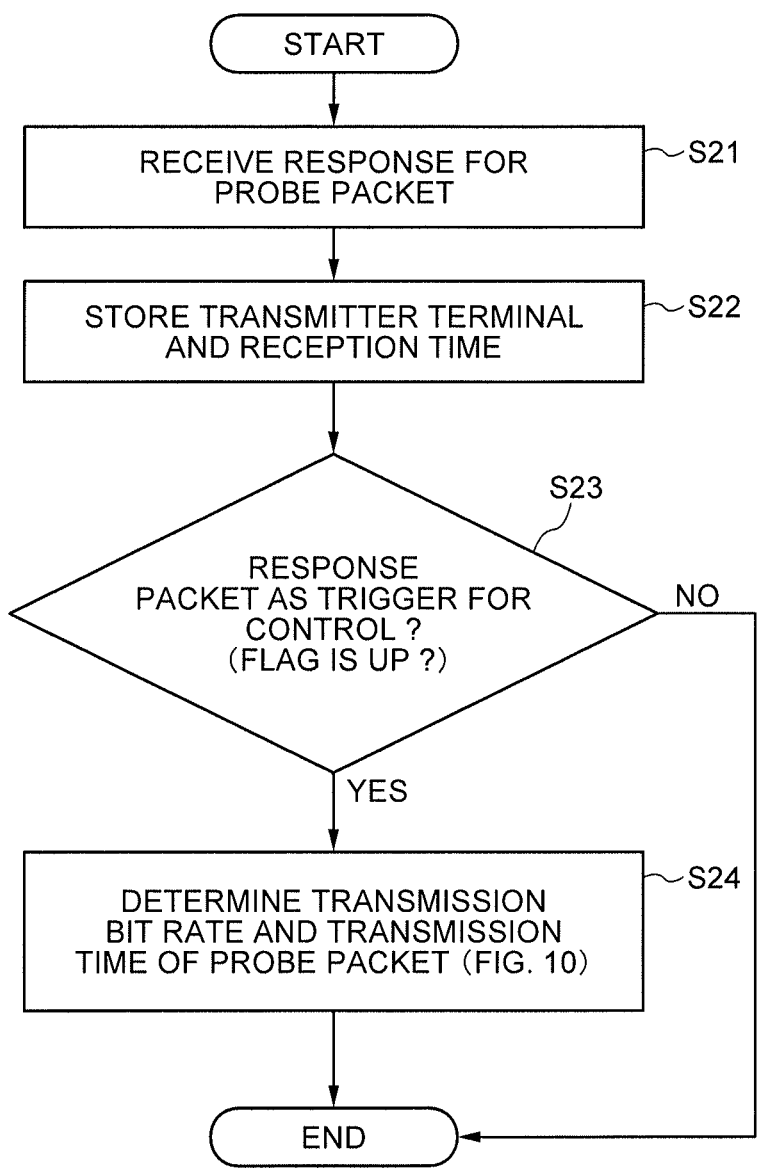
FIG. 9 is a flowchart showing operations of the content distribution device of the content distribution system shown in FIG. 1 in a case where a response from the receiving terminal for probe packets are received.

FIG. 9 is a flowchart showing operations of the content distribution device 10 when a response for the probe packets are received from the receiving terminals 20 in the content distribution system 1 shown in FIG. 1. When the probe packet receiving unit 105 of the content distribution device 10 receives a response packet (step S21), the terminal identifier 151a of the sender-terminal, the probe packet ID 152a, and the reception time 152c are transmitted to the transmission control unit 102, and the terminal information control function 123 of the transmission control unit 102 saves the received information to each field of the probing management table 152 (step S22).

Then, the terminal information control function 123 judges whether or not the received probe packets response becomes a trigger of control, i.e., whether or not a flag 152d corresponding to the probe packet ID 152a is put up (step S23). When judged that it is a response packet to be a trigger, the packet transmission control function 124 determines the bit rate and the transmission time of the probe packets (step S24). The details of the processing for determining the bit rate and the transmission time of the probe packets will be described next.

Figure 10:
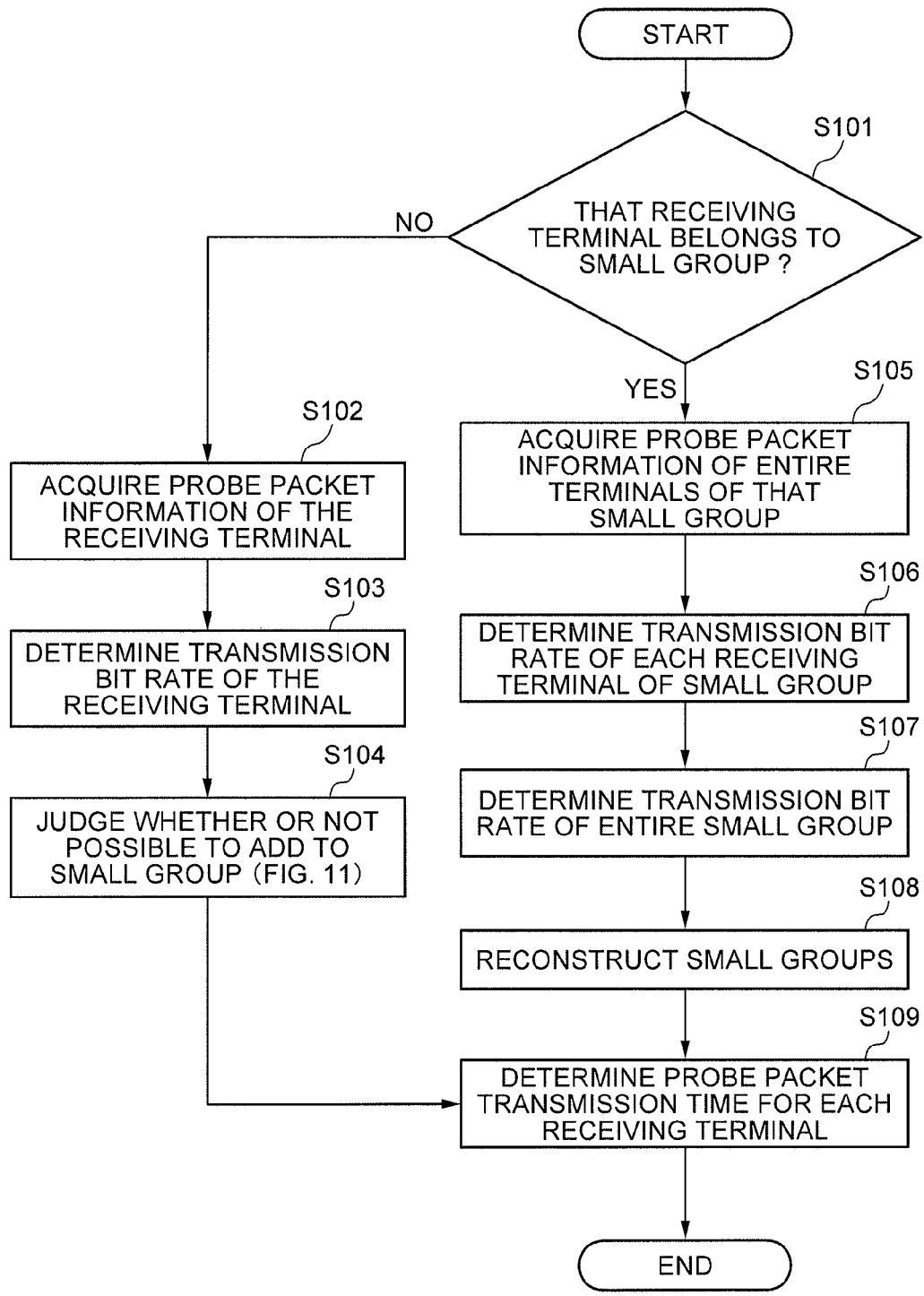
FIG. 10 is a flowchart showing the details of processing done by a packet transmission control function shown as a step S24 in FIG. 9 for determining the bit rate and the transmission time of the probe packets.

FIG. 10 is a flowchart showing the details of the processing done by the packet transmission control function 124 for determining the bit rate and the transmission time of the probe packets shown as step S24 in FIG. 9. The packet transmission control function 124 first judges whether or not the receiving terminal 20 that has transmitted the probe packets response belongs to a small group (step S101). When judged that it does not belong to the small group, the packet transmission control function 124 advances to the processing of steps S102 to S104, and determines the transmission bit rate of the receiving terminal 20 alone. When judged as belonging to the small group, the packet transmission control function 124 advances to the processing of steps S105 to S109.

When the receiving terminal 20 does not belong to the small group, the packet transmission control function 124 acquires the transmission time 152b and the reception time 152c of the probe packets from the probing management table 152 (step S102), and determines the transmission bit rate based on the difference between the transmission time 152b and the reception time 152c, i.e., based on the round-trip time of the probe packets (step S103). More specifically, as depicted in Non-Patent Document 1, the transmission bit rate can be determined by using a method such as decreasing the bit rate when there is an increase tendency in the round-trip time of the prescribed number of probe packets and increasing the bit rate when there is no increase tendency, for example.

Subsequently, the packet transmission control function 124 judges whether or not to add the receiving terminal 20 to the small group (step S104), and advances to the processing of step S109 to be described later. The details of the processing of step S104 will be described later by referring to FIG. 11.

Figure 11:
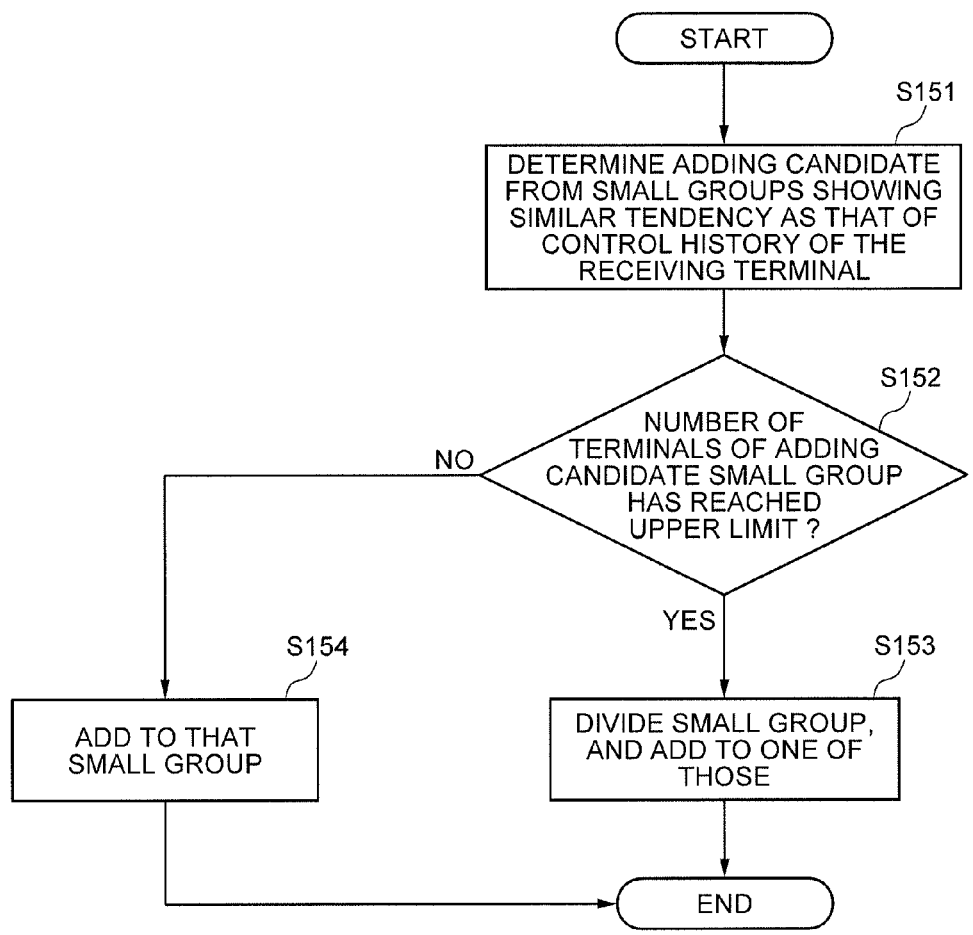
FIG. 11 is a flowchart showing the details of processing done by the packet transmission control function shown as a step S104 in FIG. 10 for judging whether or not to add the receiving terminal to the small group.

FIG. 11 is a flowchart showing the details of the processing done by the packet transmission control function 124 for judging whether or not to add the receiving terminal 20 to the small group shown as step S104 in FIG. 10. The packet transmission control function 124 first selects a candidate small group to add the receiving terminal within the large group to which the receiving terminal 20 belongs (step S151).

As the small group candidate to add, selected is the group showing the similar time variations between the control result 153b (bit rate) recorded in the group control information management table 153 of each group and the control result 154b (bit rate) recorded in the terminal control information management table 154 of the receiving terminal 20. When the passage time from the start of distribution is short and there is no sufficient control history, it is judged that there is no candidate. When there is no candidate small group, a new small group is generated and it is considered as a committed candidate.

The packet transmission control function 124 then judges whether or not the number of the terminals of the small group to be the committed candidate has reached the upper limit set in advance (step S152). In order to transmit the minimum probe packets to each of the receiving terminals 20, the upper limit is set in advance for the number of terminals of each small group. When it has not reached the upper limit, the receiving terminal 20 is simply added to the small group (step S154). When it has reached the upper limit, the candidate small group is divided into two (step S153).

When dividing the small group, it is possible to use a method which refers to the judgment results of the past of each of the terminals and divides the small group in such a manner that the similar terminals are put into a same group, a method which divides them into two groups randomly, etc. A specific processing example of the above-described processing will be described later.

As described, through adding the receiving terminal 20 to the small group based on the history of the control result of the past, the receiving terminals of similar bit rate change, i.e., the receiving terminals that are highly possible to have the same bottle-neck link, can be put into a same small group.

Returning to FIG. 10, operations of a case where the receiving terminal 20 belongs to a small group will be described. When the receiving terminal 20 belongs to the small group, the packet transmission control function 124 acquires the probe packet transmission/reception time required for the control of all the receiving terminals 20 within the small group from the terminal information storage unit 112 (step S105), and determines the transmission bit rate for each of the transmission terminals 20 by the method depicted in Non-Patent Document 1 described above or the like (step S106). The determined transmission bit rate is stored as the control result 154b of the terminal control information management table 154.

Then, the packet transmission control function 124 determines the transmission bit rate of the entire small group based on the judgment result of each of the receiving terminals 20 within the small group (step S107). The determined bit rate of each small group is stored as the control result 153b of the group control information management table 153.

As a method for determining the bit rate of the entire small group, it is possible to employ a majority rule regarding the judgment result (increased/maintained/decreased bit rate) of each of the receiving terminals 20 and let the control content of the entire receiving terminals 20 follow the majority rule. Further, it is also possible to define the increased bit rate as +1 point, maintained bit rate as 0 point, and the decreased bit rate as −1 point, for example, calculate the average value of the points, and increase the bit rate of the entire receiving terminals 20 within the small group when the average value is 0.5 or higher, decrease the bit rate of the entire receiving terminals 20 within the small group when the average value is −0.5 or lower, and maintain the bit rate in other cases.

Then, the packet transmission control function 124 reconstructs the small groups (step S108). The reconstruction of the small groups is an operation for moving the receiving terminal 20 having a different judgment result from that of the control result of the entire small group to another small group. For example, when the transmission bit rate is increased as the entire small group, the receiving terminal 20 judged as "rate decrease" is moved to another small group. At last, the probe packet transmission time for each of the receiving terminals 20 is determined (step S109).

For the receiving terminals 20 contained in the small group, the probing results of the receiving terminals 20 within the small group are taken into consideration as a whole to determine the transmission bit rate. Thus, it is possible to reduce the number of probe packets transmitted per receiving terminal 20 without deteriorating the precision. For example, in a case where ten probe packets are transmitted in every second to each receiving terminal 20 at an interval of 0.1 second and five receiving terminals 20 are contained in a small group, the number of probe packets can be reduced to one fifth by transmitting two probe packets in every second to the receiving terminals 20 contained in the small group. Further, the probe packets to be transmitted at last in a predetermined control interval is determined, and the flag 152d of the probing management table 152 is put up.

Figure 12:
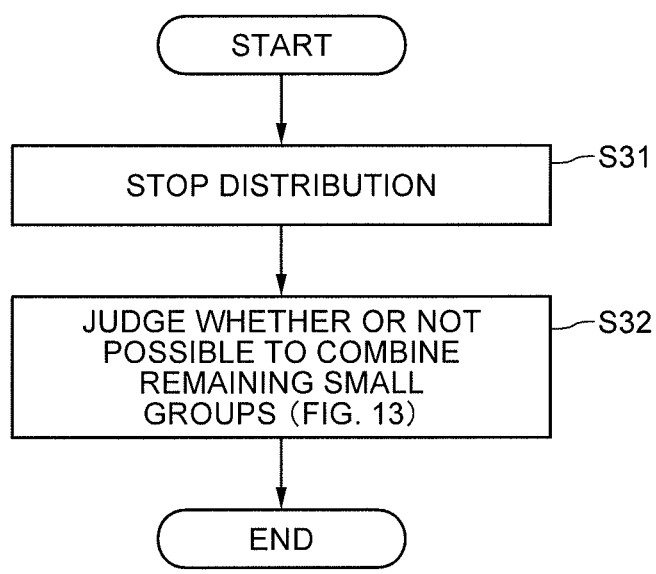
FIG. 12 is a flowchart showing operations of the content distribution device of the content distribution system shown in FIG. 1 in a case where one of the receiving terminals requests the content distribution device to stop the distribution.

FIG. 12 is a flowchart showing operations of the content distribution device 10 when one of the receiving terminals requests the content distribution device 10 to stop distribution in the content distribution system shown in FIG. 1. When the content distribution device 10 receives the distribution stop request form the receiving terminal 20 by the session control unit 101, the packet transmission control function 124 stops the distribution of the corresponding content, eliminates the entry regarding the corresponding terminal identifier 151a from the terminal management table 151, and eliminates the probing management table 152 that corresponds to the terminal identifier 151*a* (step S31).

Thereafter, the packet transmission control function 124 judges whether or not to combine the small groups (step S32). Details of the operations thereof will be described next.

FIG. 13 is a flowchart for more specifically describing the operations done by the packet transmission control function 124 described as step S32 in FIG. 12 for judging whether or not to combine the small groups. The upper limit is set to the number of receiving terminals in each small group. Thus, there may be cases where the small group to which the receiving terminal 20 of stopped distribution belongs can be combined with another small group when the number of receiving terminals is decreased by one.

Therefore, the packet transmission control function 124 first selects the small group that can be combined among the remaining small groups according to the same basis as that of step S151 shown in FIG. 11 (step S161). More specifically, the small group whose time variation in the bit rate recorded in the control result 153*b* in the group control information management table 153 of each group is similar to that of the small group to which the receiving terminal 20 of the stopped distribution is taken as a candidate to be combined.

Then, it is judged whether or not the total number of the terminals of the small group to which the receiving terminal 20 of the stopped distribution belongs and the small group of the candidate to be combined after stopping the distribution exceeds the upper limit (step S162). When the number does not exceed, the small groups are combined and the processing is ended (step S163). When the number exceeds the upper limit, the processing is ended without combining the groups.

More Specific Operation Example

The above-described first exemplary embodiment will be described by providing more specific operations. First, at the time of startup, the content distribution device 10 generates the terminal management table 151, the group control information management table 153, and the terminal control information management tale 154. Those tables do not have entries at the point of starting distribution. As the terminal identifiers in the terminal management table 151, IP addresses of each of the receiving terminals 20 are used.

Next, an operation of a case when a distribution request is received from a first receiving terminal (IP address: 10. 1. 1. 1) will be described. When the content distribution device 10 receives a distribution request (step S11 of FIG. 8), the terminal information control function 123 determines a large group of the receiving terminal, adds an entry regarding a new terminal identifier 151*a*="10. 1. 1. 1" to the terminal management table 151, and generates the probing management table 152 for the receiving terminal 20 (step S12 of FIG. 8).

FIG. 14 shows explanatory charts showing contents of each of the tables stored in the terminal information storage unit 112 at a stage where processing of receiving the distribution request from the first receiving terminal and generating the probing management table 152 is completed. FIG. 14A shows the terminal management table 151, FIG. 14B shows the probing management table 152, FIG. 14C shows the group control information management table 153, and FIG. 14D shows the terminal control information management table 154, respectively. This is the same for FIGS. 15 to 18 to be described later. In this EXAMPLE, those having IP addresses having same higher eight bits (the part corresponding to "A" provided that IP address is expressed as "A. B. C. D) are considered to be put into a same large group, and those with the decimal expression of the higher eight bits is "10" are considered as a large group A. When dividing to large groups, it is possible to check ISP (Internet Service Provider), the site, and the like from the IP address, and use the information thereof. Further, it is also possible to use GPS information and the like in addition to the IP address.

Then, the packet transmission control function 124 determines the initial value of the bit rate and the transmission time of the probe packets, and designates the start of distribution to the content packet transmission unit 103. Thereby, distribution of the content is started anew (step S13 of FIG. 8). In this EXAMPLE, it is set to start the distribution with the bit rate initial value written in a setting file in advance.

At this time, the terminal information control function 123 adds an entry in which the bit rate at the time of start of the distribution is written to the control result 154*b* of the terminal control information management table 154. Further, the probe packet transmission time is determined, and the probe packet ID 152*a* and the transmission time 152*b* thereof are recorded to the probing management table 152. Here, ID of the probe packets to be a trigger of the control (ID=5 in this EXAMPLE) is calculated based on the number of probe packets (five packets in this EXAMPLE) used in a control determined in advance, and the flag 152*d* of the entry corresponding to the probing management table 1242 (entry corresponding to the probe packet ID 152*a*=5 in this EXAMPLE) is put up. FIG. 15 shows explanatory charts showing contents of each of the tables stored in the terminal information storage unit 112 at a stage where the processing of determining the probe packet transmission time and putting up the flag is completed.

The content packet reception unit 103 and the probe packet transmission unit 104 start transmission of each content packet and probe packets based on the designation described above from the transmission control unit 102.

When the probe packet reception unit 105 receives probe packets response from the receiving terminal 20 (step S21 of FIG. 9), the probe packet reception unit 105 notifies it to the transmission control unit 102, and the terminal information control function 123 of the transmission control unit 102 stores the reception time of the response packet to the reception time field of the probing management table 152 of the terminal information storage unit 112 (step S22 of FIG. 9).

In a case where the response packet for the probe packets having the flag 152*d* (probe packet ID 152*a*=5) is received, the bit rate is determined based on a difference between the transmission time 152*b* and the reception time 152*c*, i.e., based on the round-trip time of the probe packets, and the control result (bit rate after the change) is stored as the control result 154*b* of the terminal control information management table 154 (steps S23 to 24 of FIG. 9).

Now, the bit rate setting method in step S24 of FIG. 9 will be described in details. The receiving terminal of the terminal identifier 151*a*="10. 1. 1. 1" does not belong to a small group at this point. Thus, the terminal information control function 123 executes the processing of steps S102 to 104 of FIG. 10. Further, in this EXAMPLE, judgment of adding to the small group is not executed when it is less than ten seconds from the start of distribution. When step S34 is executed after the time of ten seconds or more is passed from the start of distribution, judgment processing for adding to the small group as step S104 of FIG. 10 (or FIG. 11) is to be executed.

The receiving terminal of the terminal identifier 151*a*="10. 1. 1. 1" is the receiving terminal that has started the distribution first, so that it is not in the small group at this point. Thus, the packet transmission control function 124 newly generates a small group that is constituted only with the receiving terminal of the terminal identifier 151$a$="10. 1. 1. 1", and registers it to the terminal management table 151 as a small group ID 151$c$=1 (step S151 of FIG. 11). FIG. 16 shows explanatory charts showing contents of each of the tables stored in the terminal information storage unit 112 at a stage where processing of generating and registering a small group anew.

Subsequently, it is assumed that there is a distribution request to the content distribution device 10 from a different receiving terminal of the terminal identifier 151$a$="10. 1. 1. 2" at the time 14 [s]. The IP address of the receiving terminal starts with "10", so that the terminal information control function 123 adds an entry of this terminal to the terminal management table 151 as a same large group ID 151$b$=A as that of the receiving terminal of the terminal identifier 151$a$="10. 1. 1. 1" that is already being distributed.

The receiving terminal of the terminal identifier 151$a$="10. 1. 1. 2" does not belong to the small group at first. However, at the time 24 [s] that is ten seconds passed from the request of distribution, the packet transmission control function 124 performs processing for judging whether or not to add the terminal to a small group within the same large group (step S104 of FIG. 10, and FIG. 11).

FIG. 17 shows explanatory charts showing contents of each of the tables stored in the terminal information storage unit 112 at the point of time 24 [s]. The terminal information control function 123 judges whether or not to add the receiving terminal of the terminal identifier 151$a$="10. 1. 1. 2" that does not belong to the small group to an existing small group (the small group ID 151$c$=1) based on the information stored in the group control information management table 153 and the terminal control information management table 154 of this stage.

This judgment is done by comparing the control histories of the past ten seconds. In this EXAMPLE, the bit rate at each control time is observed to see whether it is increased, maintained, or decreased. When there is a perfectly matched small group, the receiving terminal is added to that group. When there is no perfectly matched group, a small group constituted only with that terminal is newly generated. Further, when there are a plurality of perfectly matched small groups, those groups are combined if the total number of those terminals are equal to or less than the upper limit of the number of the terminals of the small group.

Referring to the group control information management table 153 of FIG. 17, the bit rate of the small group 1 is shifted from being maintained, increased, decreased, and to being increased. In the meantime, referring to the terminal control information management table 1244, the receiving terminal of the terminal identifier 151$a$="10. 1. 1. 2" is shifted from being increased, increased, decreased, and to being increased. Thus, the tendency of the shift thereof is not consistent with that of the small group 1. Therefore, the terminal information control function 123 judges that the receiving terminal of the terminal identifier 151$a$="10. 1. 1. 2" cannot be added to the small group 1, and generates a new small group 2 (small group ID 151$c$=2) constituted only with the receiving terminal of the terminal identifier 151$a$="10. 1. 1. 2".

Thereafter, judgment regarding whether to add the receiving terminal to the existing small group or to generate a new small group for each of new receiving terminals is executed in the same manner. It is assumed that there is a request of distribution from a new receiving terminal of the terminal identifier 151$a$="10. 1. 2. 3" at a point of time 30 [s]. FIG. 18 shows explanatory charts showing contents of each of the tables stored in the terminal information storage unit 112 at a point of time 40 [s].

Up to this point, the group control information management table 153 of FIG. 18 shows that the bit rate of the small group 1 (only the receiving terminal of the terminal identifier 151$a$="10. 1. 1.1" belongs) is increased from 2 Mbps to 4 Mbps at the time 36 [s] and it is maintained until the time 40 [s], while showing that the bit rate of the small group 2 (only the receiving terminal of the terminal identifier 151$a$="10. 1. 1. 2" belongs) is decreased gradually from 3 Mbps to 1 Mbps. Further, the terminal control information management table 154 shows that the bit rate of the receiving terminal of the terminal identifier 151$a$="10. 1. 2. 3" that does not belong to the small group shows the completely same shift as that of the small group 1.

Furthermore, each of the small groups 1 and 2 only contains one terminal, so that there is a margin in terms of the upper limit of the number of the terminals. Thus, the terminal information control function 123 adds the receiving terminal of the terminal identifier 151$a$="10. 1. 2. 3" to the small group 1 (step S104 of FIG. 10, and FIG. 11).

A method for determining the probe packet transmission time for each of the receiving terminals will be described. In this EXAMPLE, five probe packets are transmitted per second to the terminal that does not belong to the small group. When one control is to be done in two seconds by using the ten probing results, the probe packets are transmitted in such a manner that the total number of probe packets to the terminal that belongs to the small group becomes ten packets in two seconds.

That is, for the small group with the two terminals, five each of the probe packets are transmitted to each terminal in two seconds. In this case, it is possible to transmit the five probe packets to one of the terminals in first one second and to transmit five probe packets to the other terminal in the next second. Alternatively, it is possible to transmit the probe packets alternately in every 0.2 seconds (to one of the terminals at the time 0, 0.4, 0.8, - - -, and to the other terminal at the time 0.2, 0.6, 1.0, - - - ). Further, the number of probe packets to be transmitted may not necessarily be set uniform for each receiving terminal. When performing reconstruction of the small groups shown next, it is necessary to know the changing state of the bit rate for each of the receiving terminals. Therefore, the transmission frequency, the order, and the like of the probe packets can be determined in any manner as long as those are within the range with which the state can be maintained.

The reconstruction of the small groups will be described. In a case where the bottle-neck link is changed from the trunk net to an access net, for example, and there is a terminal that does not share the bottle-neck link within a same small group, a part of the terminals within the small group cannot increase the bit rate while the other terminals can increase the bit rate. Thus, when the terminal of different network states are put in a same small group as in this case, reconstruction of the small groups shown in step S108 of FIG. 10 is executed in such a manner that the terminals of the same network state are put into a same small group.

FIG. 19 is an explanatory chart showing the result of being increased, maintained, decreased regarding the bit rate in step S106 of the small group constituted with three receiving terminals and an example of increase/decrease tendency of the transmission rate of the entire small group determined in step S107. In this EXAMPLE, increase/decrease of the transmission rate of the entire group is determined according to the majority rule based on the control results of the receiving terminals belonging to the small group. Further, at the time of reconstruction of the small groups, the control result of the entire group in the past ten seconds and the judgment results of each of the receiving terminals are compared, and the terminals of a large difference are eliminated from the group. The receiving terminal to be eliminated is the terminal whose judgment result is different from the control result of the entire group for the number of times equal to or more than the prescribed number of times.

FIG. 19 shows "increased", "decreased", and "maintained" regarding bit rate values of each of the receiving terminals A to C by every two seconds at the points of time 200 to 208 of each of the receiving terminals recorded as the control results 154b of the terminal control information management table 154. In this example shown herein, the receiving terminal 3 shows the tendency different from those of the other terminals. Thus, the receiving terminal C is eliminated form this small group, and added to another small group. The method for determining the small group to add is the same as the method for adding a new receiving terminal to the small group.

At last, operations of a case when a distribution stop request is received from a receiving terminal will be described. FIG. 20 is an explanatory chart showing examples of the number of receiving terminals of the small groups X to Z within a same large group and the control history. Three receiving terminals 20, three receiving terminals 20, and one receiving terminal 20 belong to the small groups X to Z, respectively. Further, the upper limit of the number of receiving terminals per small group is "5". Under such condition, one of the receiving terminals 20 belonging to the small group Y transmitted a distribution stop request to the content distribution device 10 at the point of time 210.

The content distribution device 10 upon receiving the distribution stop request stops the distribution of the content to the terminal (step S31), and judges whether or not it is possible to combine the small group (the small group 2 in this case) to which the receiving terminal of stopped distribution belongs with another small group (step S32). The judgment regarding whether or not it is possible to combine in this case is done by comparing the control histories of the past ten seconds.

FIG. 20 shows "increased", "decreased", and "maintained" regarding bit rate values of each of the small groups X to Z by every two seconds at the points of time 300 to 308 of each of the receiving terminals recorded as the control results 153b of the group control information management table 153. In this example shown herein, the control history of the small group is consistent with the control history of the small group Y, so that those small groups X and Y are the candidates to be combined (step S161).

Further, the terminals in the small group Y are decreased by one to be the two terminals, so that the total terminals in the small group X and the small group Y are five terminals. This is within the upper limit of the number of the receiving terminals, so that the packet transmission control function 124 judges that the small group X and the small group Y can be combined (step S162) and combines those into a new small group (step S163).

Overall Operations of First Exemplary Embodiment

Next, the overall operations of the above-described exemplary embodiment will be described. The content distribution method according to the exemplary embodiment is used in the content distribution system 1 constituted with the content distribution device 10 and a plurality of receiving terminals 20 mutually connected via the network 30, in which the content distribution device transmits the content data to the receiving terminal according to a request from the receiving terminal. With the method, the content packet transmission unit of the content distribution device transmits the content data to the receiving terminal (FIG. 8: steps S12 to 13), the probe packet transmission unit 104 of the content distribution device transmits probe packets used for estimating the network state to the receiving terminal, the probe packet reception unit 105 of the content distribution device receives a returned packet from the receiving terminal for the probe packets (FIG. 9: step S21), the transmission control unit of the content distribution device specifies round-trip time from the transmission of the probe packets to the reception of the returned packet, the transmission control unit of the content distribution device determines the bit rate of the content data transmitted from the specified round-trip time (FIG. 9: step S24, FIG. 10: step S107), the transmission control unit of the content distribution device defines the receiving terminals of the similar time variation in the bit rate among the receiving terminals as being in a small group (FIG. 10: step S108), and the transmission control unit of the content distribution device determines the transmission interval of the probe packets collectively for the receiving terminals that belong to the same small group (FIG. 10: step S109).

Note here that each of the operation steps may be put into a program that can be executed by a computer to have it executed by the content distribution device 10 that is a computer directly executing each of the steps. With this operation, this exemplary embodiment achieves the following effects.

This exemplary embodiment is structured to put the receiving terminals of similar bit rate time variations, i.e., the receiving terminals highly possible to share the same bottleneck link, into a same small group, so that it is not necessary to transmit the probe packets to all the receiving terminals belonging to that small group at a prescribed interval. Thus, the total number of probe packets to be transmitted can be reduced and the load of the transmission/reception can be decreased. For that, the number of streams that can be distributed simultaneously can be increased.

Further, with the exemplary embodiment, reconstruction of the small groups is executed regularly in accordance with the network state changing history. Thus, even when the bottle-neck link is changed (due to factors, e.g., a specific terminal starts or ends a large-load communication), it is possible to organize proper small groups based thereupon. This makes it possible to distribute the content to each of the receiving terminals with a proper bit rate.

Second Exemplary Embodiment

In a second exemplary embodiment of the present invention, the content distribution device of the first exemplary embodiment is structured with: a content transmission device 310 which includes a content packet transmission unit and a session control unit; and a distribution control device 320 which includes a probe packet transmission unit, a probe packet reception unit, and a transmission control unit.

With this, the same effects as those of the first exemplary embodiment can also be achieved. Further, it simply needs to add the distribution control device to an existing content transmission device, so that the present invention can be embodied at a small cost. Hereinafter, this will be described in more details.

Figure 21:
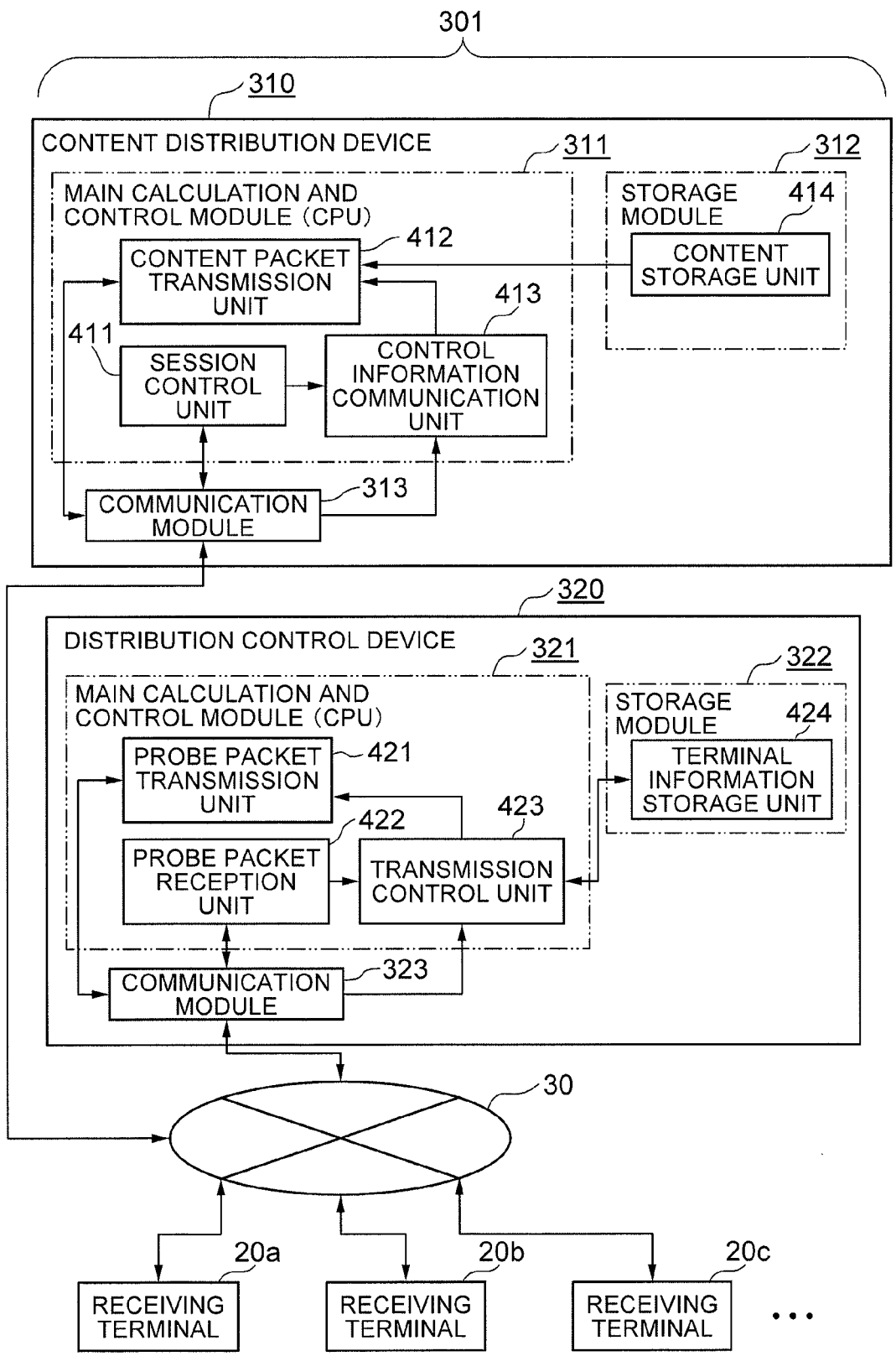
FIG. 21 is an explanatory chart showing the structure of a content distribution system according to a second exemplary embodiment of the present invention.

FIG. 21 is an explanatory chart showing the structure of a content distribution system 301 according to the second exemplary embodiment of the present invention. The content distribution system 301 is constituted by mutually connecting the content transmission device 310, the distribution control device 320, and a plurality of receiving terminals 20a, 20b, 20c, - - - (generally termed as the receiving terminals 20) via a network 30. The receiving terminals 20 and the network 30 are the same as those of the first exemplary embodiment.

Like the content distribution device 10 of the first exemplary embodiment shown in FIG. 1, the content transmission device 310 is a computer device (server) which includes: a main calculation and control module (CPU) 311 which executes computer programs; a storage module 312 for storing various kinds of data and programs; and a communication module 313 which performs data communications with other computers by being connected to the network 30.

In the main calculation and control module 311 of the content transmission device 310, a session control unit 411, a content packet transmission unit 412, and a control information communication unit 413 to be described later operate as computer programs. Further, a content storage unit 414 is secured in the storage module 312.

The session control unit 411 processes a distribution start request and a distribution stop request from the receiving terminals 20. The control information communication unit 413 receives a distribution start notification or a distribution stop notification from the session control unit 411 and transmits it to the distribution control device 320, receives designation of the transmission rate from the distribution control device 320, and transmits it to the content packet transmission unit 412. The content packet transmission unit 412 takes out the content data from the content storage unit 414, makes it into a packet, and transmits it to the receiving terminals according to the designation from the control information communication unit 413. Further, the content storage unit 414 saves each content in a format that can be distributed while switching the bit rate.

Further, the distribution control device 320 is also a computer device (server) which includes: a main calculation and control module (CPU) 321 which executes computer programs; a storage module 322 for storing various kinds of data and programs; and a communication module 323 which performs data communications with other computers by being connected to the network 30.

In the main calculation and control module 321 of the distribution control device 320, a probe packet transmission unit 421, a probe packet reception unit 422, and a transmission control unit 423 to be described later operate as computer programs. Further, a content storage unit 414 is secured in the storage module 312. Furthermore, a terminal information storage unit 424 to be described later is secured in the storage module 322.

The probe packet reception unit 422 receives a response packet for the probe packets transmitted to the receiving terminal 20, and informs the transmitter terminal, the probe packet ID, and the reception time to the transmission control unit 423 to be described later. The transmission control unit 423 determines the transmission bit rate and the probe packet transmission time based on the distribution start notification/distribution stop notification received from the content transmission device 310 and the information from the probe packet reception unit 422, and designates those to the content transmission device 310 and the probe packet transmission unit 421. The probe packet transmission unit 421 transmits the probe packets to the receiving terminal 20 based on the designation.

Figure 22:
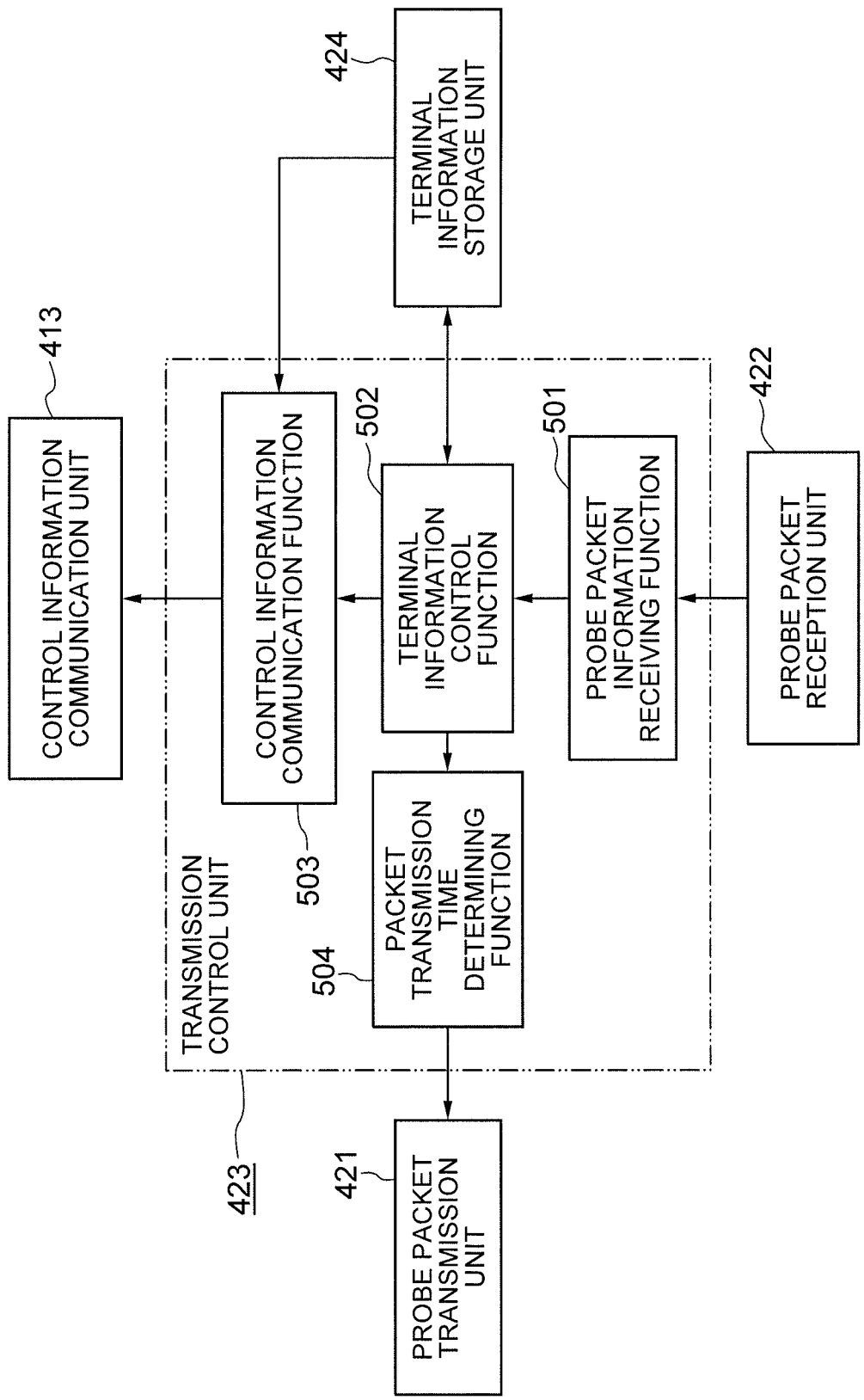
FIG. 22 is an explanatory chart showing a more detailed structure of a transmission control unit shown in FIG. 21.

FIG. 22 is an explanatory chart showing a more detailed structure of the transmission control unit 423 shown in FIG. 21. The transmission control unit 423 includes: a probe packet information receiving function 501 which receives information regarding the transmitter terminal of the response of the probe packets, the probe packet ID, and the reception time from the probe packet reception unit 422; and a terminal information control function 502 which saves each kind of information received from the probe packets receiving function 501 and a control information communication function 503 to be described later to the terminal information storage unit 424, and takes out necessary information from the terminal information storage unit 424 and transmits it to a packet transmission time determining function 504.

The transmission control unit 423 is constituted further with: the control information communication function 503 which performs communications with the control information communication unit 413 of the content transmission device 310; and the packet transmission time determining function 504 which determines the transmission bit rate and the probe packet transmission time for each of the receiving terminals 20 based on the information from the terminal information storage unit 424, and designates those to the control information communication unit 413 and the probe packet transmission unit 421 of the content transmission device 310.

The content stored in the terminal information storage unit 424 is the same as that of the terminal information storage unit 112 of the first exemplary embodiment, so that each table and information recorded therein are referred under same names and reference numerals thereof.

Figure 23:
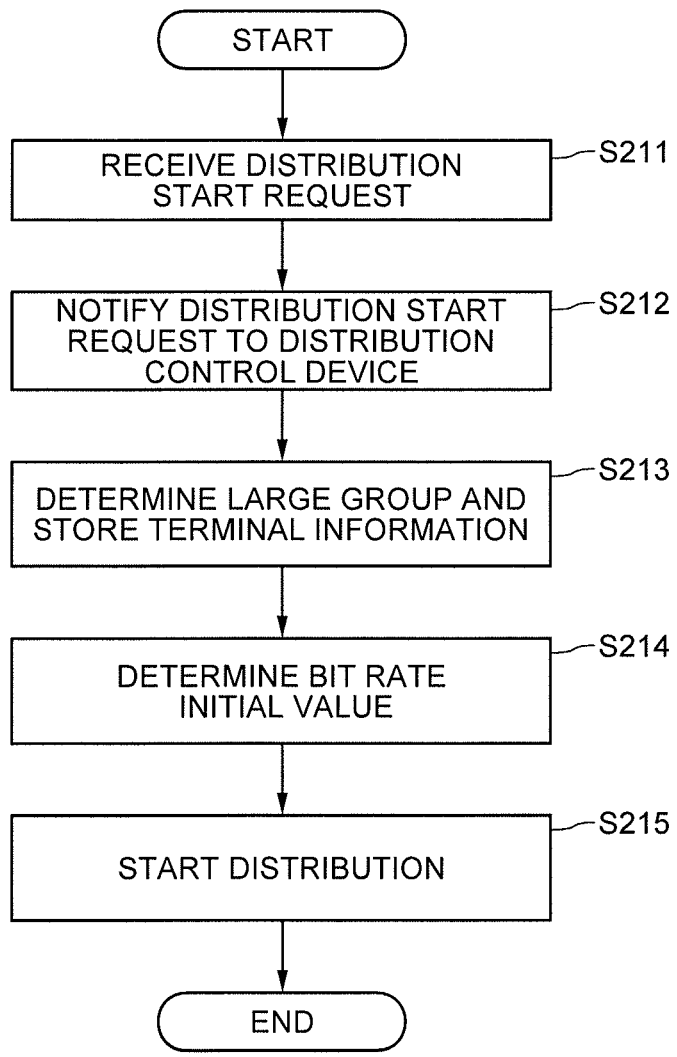
FIG. 23 is a flowchart showing operations of a content distribution device and a distribution control device of the content distribution system shown in FIG. 21 in a case where one of receiving terminals requests the content distribution device to start content distribution anew.

FIG. 23 is a flowchart showing operations of the content distribution device 310 and the distribution control device 320 of the content distribution system shown in FIG. 21 in a case where one of the receiving terminals 20 requests the content distribution device 310 to start content distribution anew. Upon receiving the distribution start request from the receiving terminal 20 by the session control unit 411 (step S211), the content transmission device 310 informs the ID of that receiving terminal 20 to the distribution control device 320 via the control information communication unit 413 (step S212).

In the distribution control device 320, the terminal information control function 502 of the transmission control unit 423 determines a large group to which the receiving terminal 20 belongs from the ID of the receiving terminal 20, adds an entry regarding the new terminal identifier 151a to the terminal management table 151 of the terminal information storage unit 424, and adds a new probing management table 152 corresponding to the terminal identifier 151a (step S213).

Then, the terminal information control function 502 of the transmission control unit 423 determines the initial value of the bit rate, and informs it to the content transmission device 310 via the control information communication function 503 (step S214). In the content transmission device 310, the content packet transmission unit 412 receives it and starts distribution of the content to the receiving terminal 20 (step S215).

Figure 24:
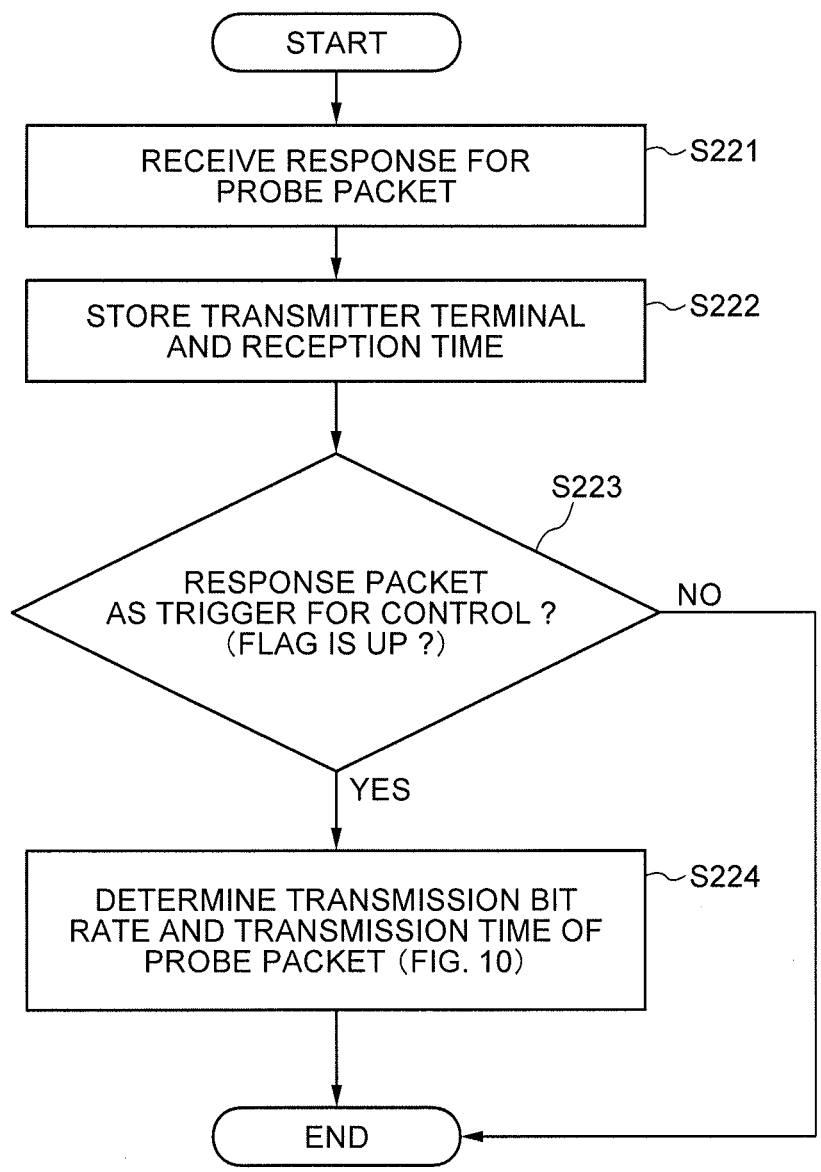
FIG. 24 is a flowchart showing operations of the distribution control device of the content distribution system shown in FIG. 21 in a case where a response from the receiving terminal for probe packets are received.

FIG. 24 is a flowchart showing operations of the distribution control device 320 of the content distribution system shown in FIG. 21 in a case where a response from the receiving terminal 20 for probe packets are received. The difference between the operations thereof and the operations of the first exemplary embodiment described in FIG. 9 is small, so that only a different point with respect to FIG. 9 will be described.

When the probe packet reception unit 422 of the distribution control device 320 receives the response packet (step S221), the transmitter terminal, the probe packet ID, and the reception time are transmitted to the transmission control unit 423. The terminal information control function 502 of the transmission control unit 423 saves the received information as the ID 152a and the reception time 152c of the probing management table 152 (step S222).

Then, the terminal information control function 502 judges whether or not the received probe packets response becomes a trigger of control, i.e., whether or not a flag 152d corresponding to the probe packet ID 152a is put up (step S223). When judged that it is a response packet to be a trigger, the packet transmission time determining function 504 determines the bit rate and the transmission time of the probe packets (step S224). The details of the processing for determining the bit rate and the transmission time of the probe packets are the same as the operations of the first exemplary embodiment shown in FIGS. 10 to 11.

Figure 25:
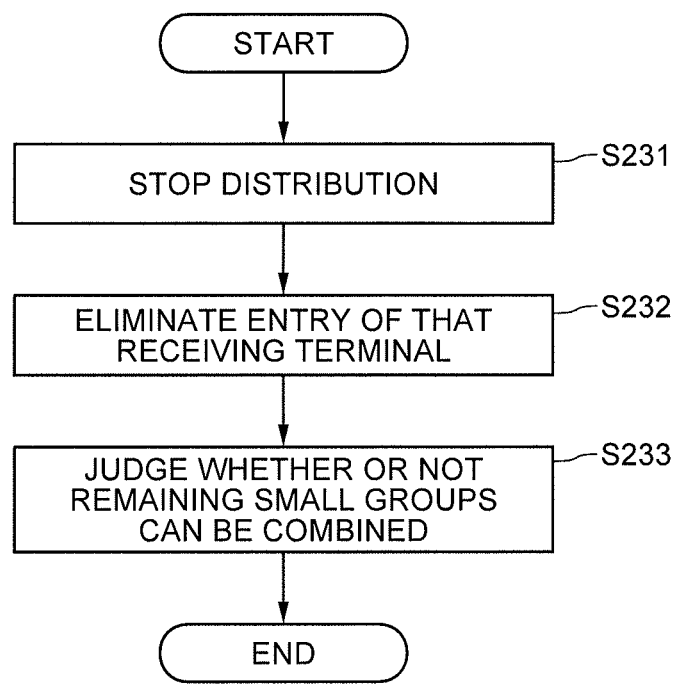
FIG. 25 is a flowchart showing operations of the content transmission device and the distribution control device of the content distribution system shown in FIG. 21 in a case where one of the receiving terminals requests the content transmission device to stop the distribution.

FIG. 25 is a flowchart showing operations of the content transmission device 310 and the distribution control device 320 of the content distribution system shown in FIG. 21 in a case where one of the receiving terminals 20 requests the content transmission device 310 to stop distribution. When the content transmission device 310 receives the distribution stop request from the receiving terminal 20 by the session control unit 411, the content packet transmission unit 412 stops distribution of the content (step S231) and informs it to the distribution control device 320 via the control information communication unit 413.

In the distribution control device 320, the terminal information control function 502 of the transmission control unit 423 upon receiving it via the control information communication function 503 eliminates the entry regarding the corresponding terminal identifier 151a from the terminal management table 151, and eliminates the probing management table 152 corresponding to the terminal identifier 151a (step S232).

Subsequently, the transmission control unit 423 judges whether or not to combine the small groups in the same manner as the case of the first exemplary embodiment (step S233). The details of the processing are the same as the operations already described as FIG. 13 in the first exemplary embodiment.

As described above, it is also possible with this exemplary embodiment to acquire the same effects by executing the same operations as those of the first exemplary embodiment. Furthermore, this exemplary embodiment can be easily embodied by simply adding the distribution control device 320 to an environment where the content transmission device 310 is already being operated. Further, it is also possible to employ a structure in which a plurality of content transmission devices 310 are controlled by a single distribution control device 320. Therefore, the same effects as those of the first exemplary embodiment can be acquired at a still smaller cost.

Expansion of Exemplary Embodiments

In the first and second exemplary embodiments described above, "increased", "maintained", and "decreased" regarding the "bit rate" are used as the changes in the network state. However, it is possible to perform grouping of the small groups more precisely by taking the changes in the bit rate into considerations in a more detailed manner such as "increased (decreased) rate" and "increased (decreased) amount".

Further, other than the bit rate, a packet loss rate, for example, can be used as a numerical value for showing the network state. In a case of using the packet loss rate, the methods described as the first and second exemplary embodiments can be employed for the control for adjusting the redundant data amount of FEC (Forward Error Correction) according to the packet loss rate.

While the present invention has been described by referring to the specific embodiments illustrated in the drawings, the present invention is not limited only to those embodiments described above. Any other known structures can be employed, as long as the effects of the present invention can be achieved therewith.

Regarding each of the embodiments described above, the new technical contents of the above-described embodiments can be summarized as follows. While a part of or a whole part of the embodiments can be summarized as follows as the new techniques, the present invention is not necessarily limited only to the followings.

Supplementary Note 1

A content distribution system constituted with a content distribution device and a plurality of receiving terminals connected mutually via a network and the content distribution device transmits content data to the receiving terminals, wherein:

the content distribution device includes a content packet transmission unit which transmits the content data to the receiving terminals, a probe packet transmission unit which transmits probe packets for estimating a state of the network to the receiving terminals, a probe packet reception unit which receives return packets for the probe packets from the receiving terminals, and a transmission control unit which specifies round-trip time from transmission of the probe packets to reception of the return packets, and determines a transmission interval of the probe packets and the bit rate of the content data to be transmitted from the round-trip time; and the transmission control unit defines the reception terminals having similar time variations in the bit rate among the receiving terminals as a small group, and determines the transmission interval of the probe packets and the bit rate of the content data to be transmitted collectively for the receiving terminals belonging to the same small group.

Supplementary Note 2

The content distribution system as depicted in Supplementary Note 1, wherein the transmission control unit includes a function which judges the time variation in the bit rate of each of the receiving terminals every time a prescribed number of the probe packets are transmitted and reconstructs the small groups based on the judgment result.

Supplementary Note 3

The content distribution system as depicted in Supplementary Note 2, wherein the transmission control unit includes a function which, regarding the receiving terminal not belonging to the small group, adds the receiving terminal to the small group every time a prescribed number of the probe packets are transmitted provided that the receiving terminal has the time variation in the bit rate similar to that of the existing small group and number of the receiving terminals belonging to that small group is within an upper limit given in advance.

Supplementary Note 4

The content distribution system as depicted in Supplementary Note 3, wherein
the transmission control unit includes a function which, when the session control unit receives a distribution stop request from one of the receiving terminals, combines the small groups whose time variations in the bit rate are similar and whose total number of receiving terminals belonging thereto is within the upper limit among the existing small groups.

Supplementary Note 5

The content distribution system as depicted in Supplementary Note 2, wherein
the transmission control unit performs judgment regarding the time variation in the bit rate of the receiving terminals and reconstruction of the small groups every time a prescribed number of the probe packets are transmitted.

Supplementary Note 6

The content distribution system as depicted in Supplementary Note 1, wherein
the content distribution device is constituted with:
a content transmission device including the content packet transmission unit and the session control unit; and
a distribution control device including the probe packets transmission unit, the probe packet reception unit, and the transmission control unit.

Supplementary Note 7

A content distribution device which is constituted by being mutually connected to a plurality of receiving terminals via a network and transmits content data to the receiving terminals, and the content distribution device includes:
a content packet transmission unit which transmits the content data to the receiving terminals;
a probe packet transmission unit which transmits probe packets for estimating a state of the network to the receiving terminals;
a probe packet reception unit which receives return packets for the probe packets from the receiving terminals; and
a transmission control unit which specifies round-trip time from transmission of the probe packets to reception of the return packets, and determines a transmission interval of the probe packets and the bit rate of the content data to be transmitted from the round-trip time, wherein
the transmission control unit defines the reception terminals having similar time variations in the bit rate among the receiving terminals as a small group, and determines a transmission interval of the probe packets and the bit rate of the content data to be transmitted collectively for the receiving terminals belonging to the same small group.

Supplementary Note 8

A distribution control device constituted by being mutually connected to a plurality of receiving terminals and a content transmission device that transmits the content data to the receiving terminals via a network, which determines the bit rate of the content data transmitted to the receiving terminals from the content transmission device. The distribution control device includes:
a probe packet transmission unit which transmits probe packets for estimating a state of the network to the receiving terminals;
a probe packet reception unit which receives return packets for the probe packets from the receiving terminals; and
a transmission control unit which specifies round-trip time from transmission of the probe packets to reception of the return packets, and determines a transmission interval of the probe packets and the bit rate of the content data to be transmitted from the round-trip time, wherein
the transmission control unit defines the reception terminals having similar time variations in the bit rate among the receiving terminals as a small group, and determines a transmission interval of the probe packets and the bit rate of the content data to be transmitted collectively for the receiving terminals belonging to the same small group.

Supplementary Note 9

A content distribution method used for a content distribution system constituted with a content distribution device and a plurality of receiving terminals connected mutually via a network, wherein the content distribution device transmits content data to the receiving terminals. The method is characterized that:
a content packet transmission unit of the content distribution device transmits the content data to the receiving terminals;
a probe packet transmission unit of the content distribution device transmits probe packets for estimating a state of the network to the receiving terminals;
a probe packet reception unit of the content distribution device receives return packets for the probe packets from the receiving terminals;
a transmission control unit of the content distribution device specifies round-trip time from transmission of the probe packets to reception of the return packets;
the transmission control unit of the content distribution device determines the bit rate of the content data to be transmitted from the round-trip time;
the transmission control unit of the content distribution device defines the receiving terminals having similar time variations in the bit rate among the receiving terminals as a small group; and
the transmission control unit of the content distribution device determines a transmission interval of the probe packets collectively for the receiving terminals belonging to the same small group.

Supplementary Note 10

A content distribution method used for a content distribution system constituted with a plurality of receiving terminals, a content transmission device that transmits the content data to the receiving terminals, and a distribution control device that determines a bit rate of the content data transmitted to the receiving terminals from the content transmission device connected mutually via a network. The method is characterized that:
a content packet transmission unit of the content transmission device transmits the content data to the receiving terminals;
a probe packet transmission unit of the distribution control device transmits probe packets for estimating a state of the network to the receiving terminals;

a probe packet reception unit of the distribution control device receives return packets for the probe packets from the receiving terminals;

a transmission control unit of the distribution control device specifies round-trip time from transmission of the probe packets to reception of the return packets;

the transmission control unit of the content distribution device determines the bit rate of the content data to be transmitted from the round-trip time;

the transmission control unit of the distribution control device defines the receiving terminals having similar time variations in the bit rate among the receiving terminals as a small group; and the transmission control unit of the distribution control device determines a transmission interval of the probe packets collectively for the receiving terminals belonging to the same small group and transmits it to the content transmission device.

Supplementary Note 11

A content distribution program used in a content distribution system which is constituted with a content distribution device and a plurality of receiving terminals connected mutually via a network and the content distribution device transmits content data to the receiving terminals. The program is characterized to cause a computer provided to the content distribution device to execute:

a procedure for transmitting the content data to the receiving terminals;

a procedure for transmitting probe packets for estimating a state of the network to the receiving terminals;

a procedure for receiving return packets for the probe packets from the receiving terminals;

a procedure for specifying round-trip time from transmission of the probe packets to reception of the return packets;

a procedure for determining the bit rate of the content data to be transmitted from the specified round-trip time;

a procedure for defining the receiving terminals having similar time variations in the bit rate among the receiving terminals as a small group; and a procedure for determining a transmission interval of the probe packets collectively for the receiving terminals belonging to the same small group.

Supplementary Note 12

A content distribution program used in a content distribution system which is constituted with a plurality of receiving terminals, a content transmission device that transmits the content data to the receiving terminals, and a distribution control device that determines a bit rate of the content data transmitted to the receiving terminals from the content transmission device connected mutually via a network. The program is characterized to cause a computer provided to the distribution control device to execute:

a procedure for transmitting probe packets for estimating a state of the network to the receiving terminals;

a procedure for receiving return packets for the probe packets from the receiving terminals;

a procedure for specifying round-trip time from transmission of the probe packets to reception of the return packets;

a procedure for determining the bit rate of the content data to be transmitted from the specified round-trip time;

a procedure for defining the receiving terminals having similar time variations in the bit rate among the receiving terminals as a small group; and a procedure for determining a transmission interval of the probe packets collectively for the receiving terminals belonging to the same small group and transmitting it to the content transmission device.

This Application claims the Priority right based on Japanese Patent Application No. 2010-164715 filed on Jul. 22, 2010 and the disclosure thereof is hereby incorporated by reference in its entirety.

INDUSTRIAL APPLICABILITY

The present invention can be applied to a content distribution system which distributes media data such as videos and audios via the Internet.

REFERENCE NUMERALS 1, 301 Content distribution system
10 Content distribution device
11, 311, 321 Main calculation and control module
12, 312, 322 Storage module
13, 313, 323 Communication module
20 Receiving terminal
30 Network
40 Bottle-neck link
50a Small group
60a Large group
101, 411 Session control unit
102, 423 Transmission control unit
103, 412 Content packet transmission unit
104, 421 Probe packet transmission unit
105, 422 Probe packet reception unit
111, 414 Content storage unit
112, 424 Terminal information storage unit
121 Session information receiving function
122, 501 Probe packet information receiving function
123, 502 Terminal information control function
124 Packet transmission control function
151 Terminal management table
152 Probing management table
153 Group control information management table
154 Terminal control information management table
310 Content transmission device
320 Distribution control device
413 Control information communication unit
503 Control information communication function
504 Packet transmission time determining function

The invention claimed is:

1. A content distribution system comprising a content distribution device and a plurality of receiving terminals connected mutually via a network, the content distribution device configured to transmit content data to the receiving terminals, wherein:

the content distribution device comprises:
a content packet transmission unit configured to transmit the content data to the receiving terminals,
a probe packet transmission unit configured to transmit probe packets for estimating a state of the network to the receiving terminals,
a probe packet reception unit configured to receive return packets for the probe packets from the receiving terminals, and
a transmission control unit configured to specify round-trip time from transmission of the probe packets to reception of the return packets, and to determine a transmission interval of the probe packets and the bit rate of the content data to be transmitted from the round-trip time, and the transmission control unit comprises a function which defines the reception terminals having similar time variations in the bit rate among the receiving terminals as a small group, and determines the transmission interval of the probe packets and the bit rate of the content data to be transmitted collectively for the receiving terminals belonging to the same small group, and, a function which judges the time variation in the bit rate of each of the receiving terminals belonging to the small groups and reconstructs the small groups based on the judgment result.

2. The content distribution system as claimed in claim 1, wherein the transmission control unit further comprises a function which moves the receiving terminal having a different judgment result from that of the control result of the entire small group to another small group when reconstructing the small groups based on the judgment result.

3. The content distribution system as claimed in claim 2, wherein the transmission control unit further comprises a function which, regarding the receiving terminal not belonging to the small group, adds the receiving terminal to the small group provided that the receiving terminal has the time variation in the bit rate similar to that of the existing small group and number of the receiving terminals belonging to that small group is within an upper limit given in advance.

4. The content distribution system as claimed in claim 3, wherein the transmission control unit further comprises a function which, when the session control unit receives a distribution stop request from one of the receiving terminals, combines the small groups whose time variations in the bit rate are similar and whose total number of receiving terminals belonging thereto is within the upper limit among the existing small groups.

5. The content distribution system as claimed in claim 2, wherein the transmission control unit is further configured to perform judgment regarding the time variation in the bit rate of the receiving terminals and reconstruction of the small groups every time a prescribed number of the probe packets are transmitted.

6. The content distribution system as claimed in claim 1, wherein the content distribution device comprises:
a content transmission device comprising the content packet transmission unit and the session control unit; and
a distribution control device comprising the probe packet transmission unit, the probe packet reception unit, and the transmission control unit.

7. A content distribution device configured to be connected mutually to a plurality of receiving terminals via a network and to transmit content data to the receiving terminals, the content distribution device comprising:

a content packet transmission unit configured to transmit the content data to the receiving terminals;

a probe packet transmission unit configured to transmit probe packets for estimating a state of the network to the receiving terminals;

a probe packet reception unit configured to receive return packets for the probe packets from the receiving terminals; and a transmission control unit configured to specify round-trip time from transmission of the probe packets to reception of the return packets, and to determine a transmission interval of the probe packets and the bit rate of the content data to be transmitted from the round-trip time, wherein the transmission control unit comprises a function which defines the reception terminals having similar time variations in the bit rate among the receiving terminals as a small group, and determines a transmission interval of the probe packets and the bit rate of the content data to be transmitted collectively for the receiving terminals belonging to the same small group, and a function which judges the time variation in the bit rate of each of the receiving terminals belonging to the small groups and reconstructs the small groups based on the judgment result.

8. A content distribution method used for a content distribution system constituted with a content distribution device and a plurality of receiving terminals connected mutually via a network, the content distribution device transmitting content data to the receiving terminals, wherein:

a content packet transmission unit of the content distribution device transmits the content data to the receiving terminals;

a probe packet transmission unit of the content distribution device transmits probe packets for estimating a state of the network to the receiving terminals;

a probe packet reception unit of the content distribution device receives return packets for the probe packets from the receiving terminals;

a transmission control unit of the content distribution device specifies round-trip time from transmission of the probe packets to reception of the return packets;

the transmission control unit of the content distribution device determines the bit rate of the content data to be transmitted from the round-trip time;

the transmission control unit of the content distribution device defines the receiving terminals having similar time variations in the bit rate among the receiving terminals as a small group;

the transmission control unit of the content distribution device determines a transmission interval of the probe packets collectively for the receiving terminals belonging to the same small group;

the transmission control unit of the content distribution device judges the time variation in the bit rate of each of the receiving terminals belonging to the small groups; and the transmission control unit of the content distribution device reconstructs the small groups based on the judgment result.

9. A non-transitory computer readable recording medium storing a content distribution program to be used in a content distribution system comprising a content distribution device and a plurality of receiving terminals connected mutually via a network and the content distribution device is configured to transmit content data to the receiving terminals, the program causing a computer provided to the content distribution device to execute:

a procedure for transmitting the content data to the receiving terminals;

a procedure for transmitting probe packets for estimating a state of the network to the receiving terminals;

a procedure for receiving return packets for the probe packets from the receiving terminals;
a procedure for specifying round-trip time from transmission of the probe packets to reception of the return packets;
a procedure for determining the bit rate of the content data to be transmitted from the specified round-trip time;
a procedure for defining the receiving terminals having similar time variations in the bit rate among the receiving terminals as a small group;
a procedure for determining a transmission interval of the probe packets collectively for the receiving terminals belonging to the same small group;
a procedure for judging the time variation in the bit rate of each of the receiving terminals belonging to the small groups; and
a procedure for reconstructing the small groups based on the judgment result.

* * * * *